US012240957B2

(12) United States Patent
Lofftus et al.

(10) Patent No.: US 12,240,957 B2
(45) Date of Patent: Mar. 4, 2025

(54) METHOD FOR FABRICATING IMPERMEABLE POROUS PARTICLES

(71) Applicant: Eastman Kodak Company, Rochester, NY (US)

(72) Inventors: Kevin D. Lofftus, Fairport, NY (US); John Leonard Muehlbauer, Stafford, NY (US); Mridula Nair, Penfield, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 144 days.

(21) Appl. No.: 17/545,079

(22) Filed: Dec. 8, 2021

(65) Prior Publication Data
US 2022/0195138 A1  Jun. 23, 2022

Related U.S. Application Data

(60) Provisional application No. 63/126,633, filed on Dec. 17, 2020.

(51) Int. Cl.
| C08J 3/12 | (2006.01) |
| C08J 9/28 | (2006.01) |
| C08J 9/36 | (2006.01) |
| C08K 7/22 | (2006.01) |
| C09D 5/02 | (2006.01) |
| C09D 5/30 | (2006.01) |
| C09D 7/40 | (2018.01) |
| C09D 7/41 | (2018.01) |
| C09D 7/65 | (2018.01) |
| C09D 11/023 | (2014.01) |
| C09D 11/037 | (2014.01) |
| C09D 11/106 | (2014.01) |
| C09D 11/107 | (2014.01) |
| C09D 133/04 | (2006.01) |

(52) U.S. Cl.
CPC ............ *C08J 9/365* (2013.01); *C08J 3/126* (2013.01); *C08J 9/286* (2013.01); *C09D 5/022* (2013.01); *C09D 5/30* (2013.01); *C09D 7/41* (2018.01); *C09D 7/65* (2018.01); *C09D 7/70* (2018.01); *C09D 11/023* (2013.01); *C09D 11/037* (2013.01); *C09D 11/107* (2013.01); *C09D 133/04* (2013.01); *C08J 2201/0544* (2013.01)

(58) Field of Classification Search
CPC ......... C08J 3/126; C08J 9/286; C08J 2333/12
See application file for complete search history.

(56) References Cited

U.S. PATENT DOCUMENTS

| 3,879,314 | A | 4/1975 | Gunning et al. |
| 4,611,524 | A | 9/1986 | Ferris |
| 4,833,060 | A | 5/1989 | Nair et al. |
| 4,965,131 | A | 10/1990 | Nair et al. |
| 5,055,513 | A | 10/1991 | Banford et al. |
| 5,478,705 | A | 12/1995 | Czekai |
| 5,563,226 | A | 10/1996 | Muehlbauer et al. |
| 5,851,280 | A | 12/1998 | Belmont et al. |
| 6,726,991 | B2 | 4/2004 | Kaeding et al. |
| 6,805,957 | B1 | 10/2004 | Santos et al. |
| 6,873,283 | B2 | 3/2005 | Zaar |
| 7,754,409 | B2 | 7/2010 | Nair et al. |
| 7,887,984 | B2 | 2/2011 | Nair et al. |
| 7,888,410 | B2 | 2/2011 | Nair et al. |
| 8,192,909 | B2 | 6/2012 | Jin et al. |
| 8,220,379 | B2 | 7/2012 | Curry |
| 8,252,414 | B2 | 8/2012 | Putnam et al. |
| 8,277,876 | B1 | 10/2012 | Butz |
| 8,307,748 | B2 | 11/2012 | Saucedo et al. |
| 8,329,783 | B2 | 12/2012 | Nair et al. |
| 8,703,834 | B2 | 4/2014 | Nair et al. |
| 8,940,362 | B2 | 1/2015 | Massa et al. |
| 9,062,938 | B2 | 6/2015 | McIntosh et al. |
| 9,074,849 | B1 | 7/2015 | McIntosh et al. |
| 9,376,540 | B2 | 6/2016 | Boris et al. |
| 9,683,064 | B2 | 6/2017 | Robinson |
| 9,891,350 | B2 | 2/2018 | Lofftus et al. |
| 2010/0266847 | A1* | 10/2010 | Wickert ............ B01J 20/28016 264/319 |
| 2014/0261084 | A1 | 9/2014 | Jones |
| 2014/0308221 | A1 | 10/2014 | Schlossman et al. |
| 2015/0030842 | A1* | 1/2015 | Hama ................ B01J 20/28061 502/402 |
| 2020/0199373 | A1 | 6/2020 | Lofftus |
| 2020/0199379 | A1 | 6/2020 | Lofftus |
| 2020/0199381 | A1 | 6/2020 | Lofftus |

FOREIGN PATENT DOCUMENTS

| JP | 04-096760 | 6/2008 |
| JP | 05-283111 | 9/2013 |

* cited by examiner

Primary Examiner — Melissa A Rioja
(74) Attorney, Agent, or Firm — David A. Novais; J. Lanny Tucker

(57) ABSTRACT

A method for preparing core/shell particles includes forming a suspension of ethylenically unsaturated monomer droplets containing one or more monomers and a porogen in an aqueous medium containing a first stabilizer and a polymerization initiator, wherein at least one of the monomers is a cross-linking monomer, and wherein the first stabilizer is an inorganic colloid. The method further includes polymerizing the one or more monomers to form core/shell particles having a core of a porous polymer and a polymeric shell having a shell thickness of at least 5 nm, wherein any pores in the polymeric shell have a diameter of less than 2 nm.

5 Claims, 11 Drawing Sheets

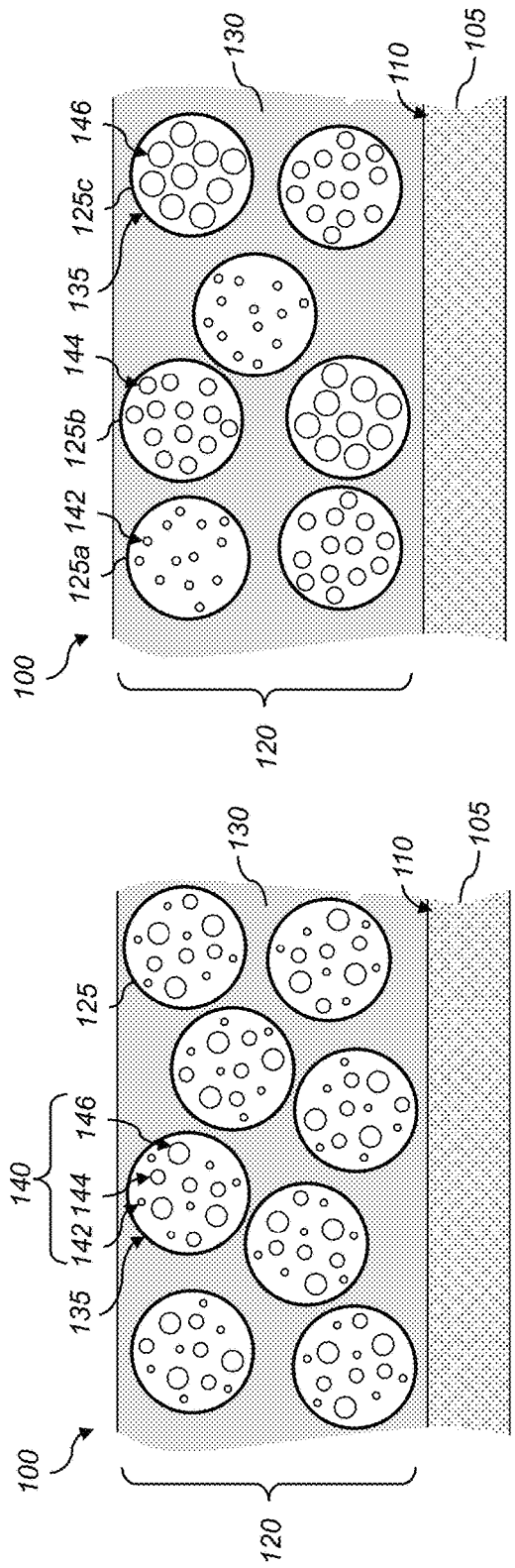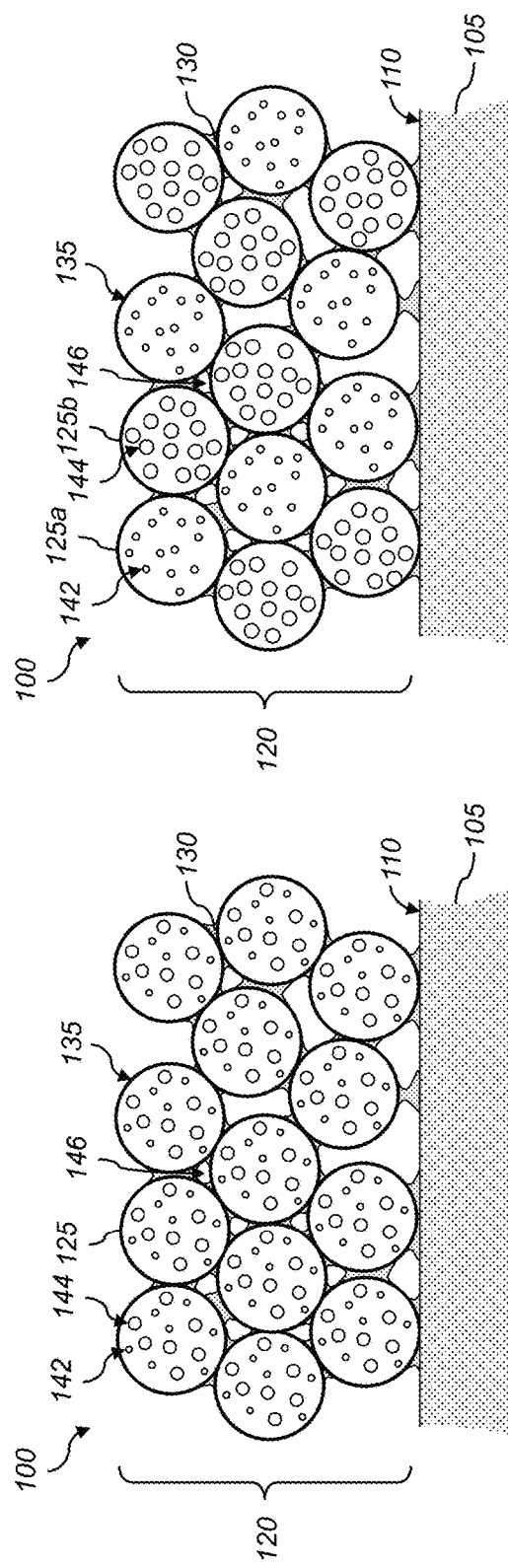

Figure 1:
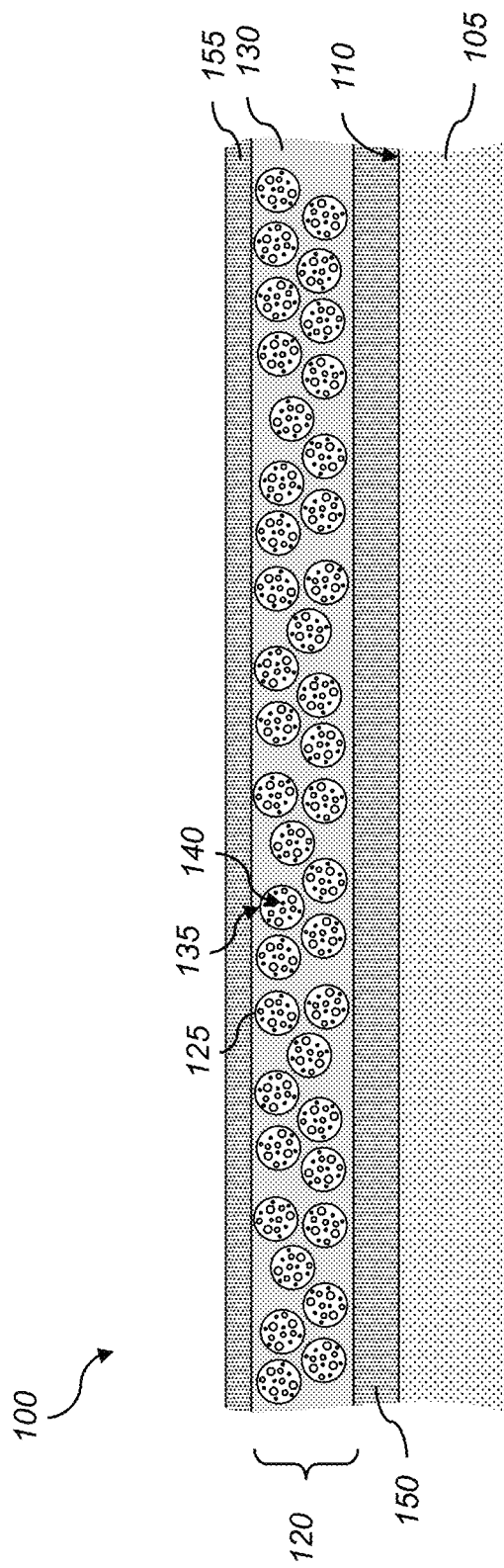

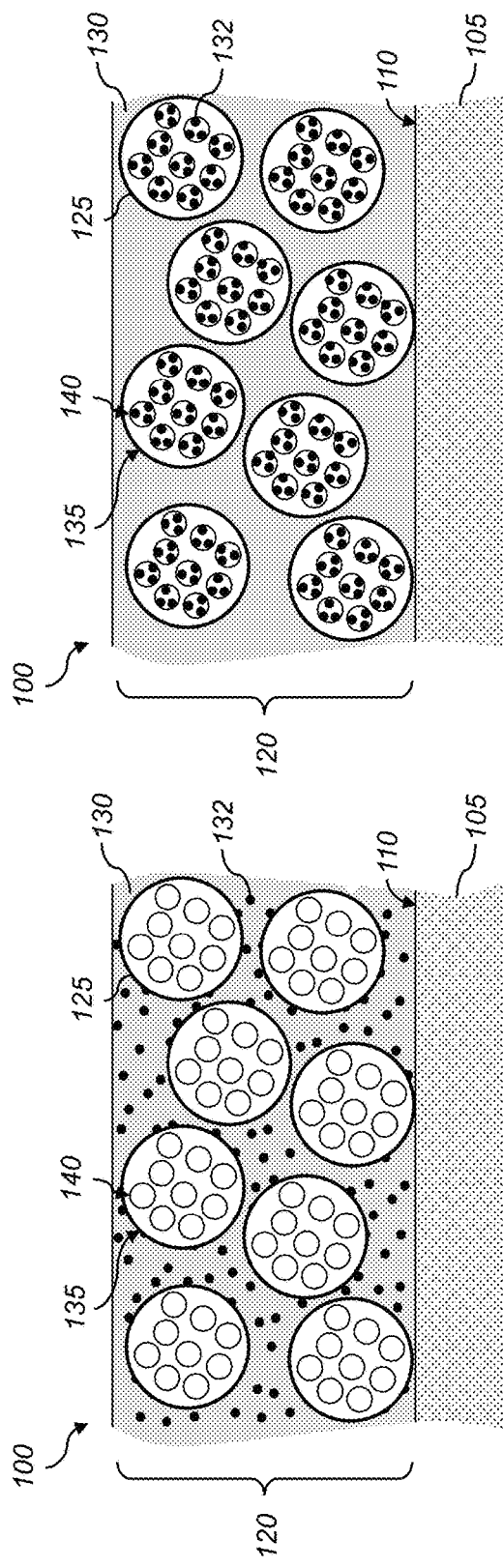
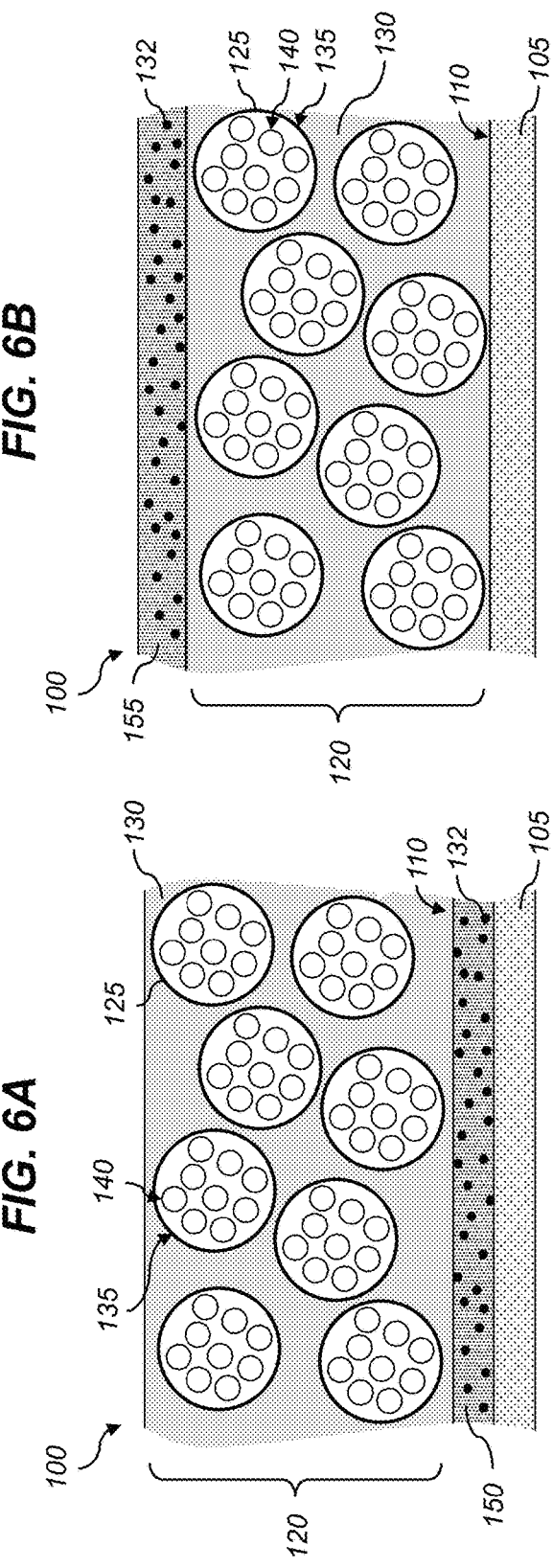

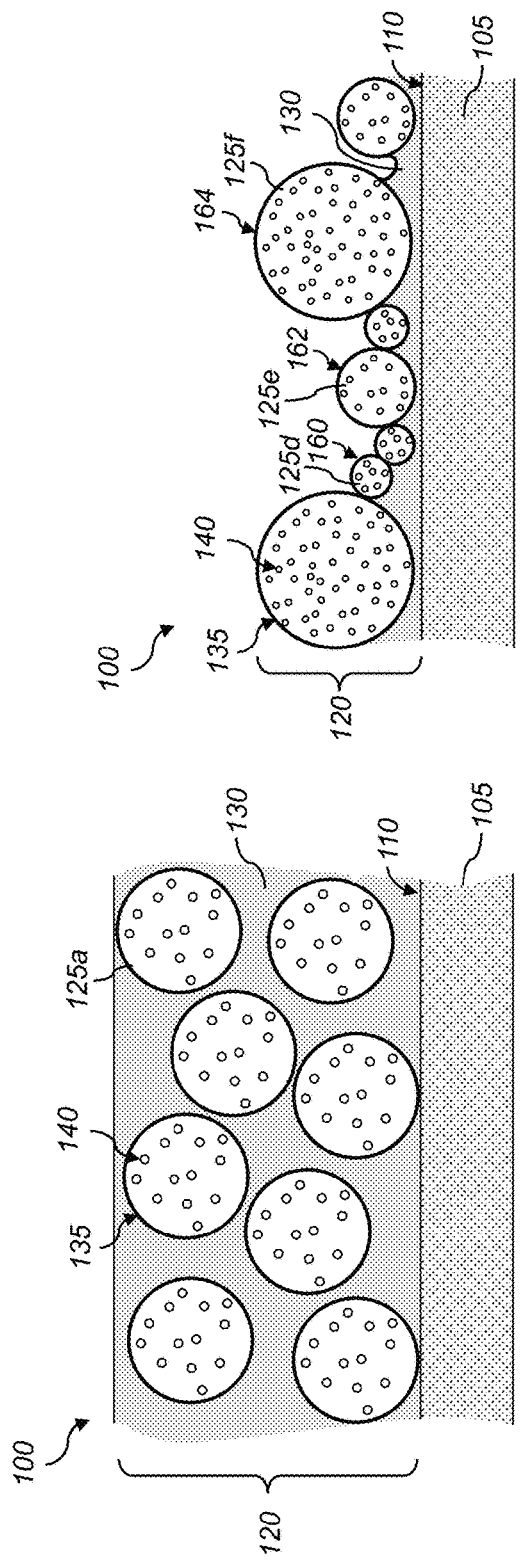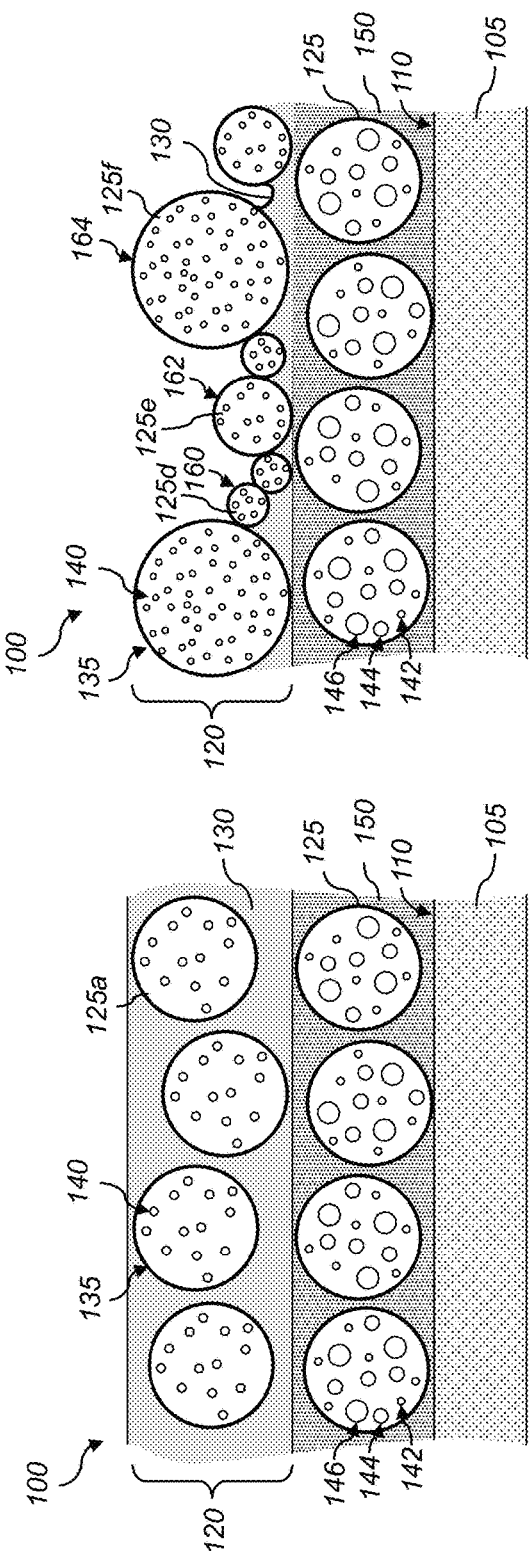

METHOD FOR FABRICATING IMPERMEABLE POROUS PARTICLES

CROSS-REFERENCE TO RELATED APPLICATIONS

This application claims the benefit of U.S. Provisional Patent Application No. 63/126,633, filed Dec. 17, 2020, which is incorporated herein by reference in its entirety. Reference is made to commonly assigned, U.S. Patent Application Ser. No. 63/126,627, entitled: "Coating providing panchromatic scattering", by K. Lofftus; to commonly assigned, co-pending U.S. Patent Application Ser. No. 63/126,630, entitled: "Coating providing controlled absorption and scattering", by K. Lofftus; and to commonly assigned, U.S. Patent Application Ser. No. 63/126,631, entitled: "Coating providing ultraviolet scattering", by K. Lofftus; and to commonly assigned, U.S. Patent Application Ser. No. 63/126,635, entitled: "Impermeable polymeric porous particles", by K. Lofftus et al., each of which is incorporated herein by reference.

FIELD OF THE INVENTION

This invention pertains to the field of porous polymer particles, and more particularly to method for fabricating porous polymer particles that are impermeable to a liquid.

BACKGROUND OF THE INVENTION

The purpose of camouflage is to prevent, hinder, or delay the detection or identification of an object, and in the case of warfare, acquisition by weapon targeting systems. This is generally accomplished by controlling the appearance of the surface of the object so that it blends in with the background. Camouflage uniforms have for many years been provided to the armed services, to enable soldiers to blend into their surroundings and so minimize their risk of being detected by an enemy. Traditional camouflage patterns aim to visually disrupt the shape of the body, so that the body outline is less easily recognized, and also to provide colors or areas of light and dark which approximate their surroundings. Traditionally, such camouflage has been aimed at being effective in the visible region of the spectrum.

The design of the camouflage generally depends upon the background against which an object is to be concealed. For flat fields of constant color such as the sky or unbroken snow, the design must reduce the objects contrast with the background color thereby reducing the modulation. Background scenes such as deserts and woodlands have spectral content which varies with wavelength giving rise to colors. There is a modulation pattern associated with each color which can be characterized as a function of spatial frequency. Camouflage for these types of background scenes preferably matches the spatial frequency characteristics for the colors in the scene.

Camouflage has traditionally focused on the visible portion of the spectrum, but the use of detection systems that are sensitive to other wavelength bands (e.g., infrared or ultraviolet) can enable the detection of camouflaged objects that would be difficult to detect visually. For example, the Woodland pattern used by the military in the Vietnam War has no high near infrared reflectance to emulate green foliage, risking exposure of camouflaged objects or persons by hyperspectral analysis.

U.S. Pat. No. 4,611,524 describes camouflage to conceal or delay identification of a vehicle by matching background visual color on a portion of target. A target becomes detectable when the contrast of the target with the background exceeds a certain threshold which will be a function of the imaging system MTF and noise characteristics. It becomes identifiable when the contrast for each of a plurality of portions of the target is large enough so that the shape of the target can be determined.

U.S. Pat. No. 6,805,957 describes a disruptive camouflage pattern system that uses specialized techniques for printing the camouflage pattern onto fabric. The system provides camouflage in both the human visible light and the near infrared range. The system provides a macro pattern resulting from a repeat of a micro pattern. The system functions by the macro pattern being disruptive of the subject's shape and the micro pattern having sharp edge units of a size capable of blending the subject into its background.

U.S. Pat. No. 8,307,748 describes camouflage pattern designs to provide a range of contrast at multiple scales.

U.S. Pat. Nos. 9,062,938 and 9,074,849 describe camouflage patterns on a substrate such as a fabric including a set of intermixed colored blotches selected from a group of colors.

U.S. Pat. No. 3,879,314 discloses aqueous slurries of vesiculated polyester resin granules useful as additive colorant in paints U.S. Pat. No. 5,055,513 discloses compositions suitable for use as a camouflage material based on vesiculated granules of polymer material containing a light reflecting agent. The agent is an oxide, hydroxide or insoluble salt of magnesium or an insoluble mixed salt of calcium and magnesium.

U.S. Pat. No. 6,873,283 discloses a camouflage device including a camouflage balloon that can be inflated through an opening to provide rapidly deployable camouflage.

U.S. Pat. No. 8,220,379 discloses UV-interactive particles suspended in a binding agent which transmit, reflect, absorb and/or scatter ultraviolet rays while being transparent for visible and infrared spectral wavelengths.

U.S. Pat. No. 8,277,876 discloses a camouflage pattern on an item that emulates the color and UV reflection properties of a landscape pattern but does not teach how to achieve the UV reflection.

Commonly-assigned U.S. Pat. No. 9,891,350, which is incorporated herein by reference, discloses a light-blocking article having an opacifying layer including porous polymeric particles where the opacifying layer comprised 5 to 30% interstitial voids.

U.S. Patent Application 2014/0261084 discloses a UV reflective pigment including alternating layers of high or low refractive index material.

Japanese patent JP4096760B2 discloses a far-infrared camouflage material including metal thin-film layer, a fine particle-containing resin layer, and a camouflage coloring agent-containing resin layer.

Japanese patent JP5283111B2 discloses a light reflecting material which is composed of hollow particles constituted of a silicon oxide-based porous shell having a plurality of micropores.

Most currently-available additive colorants are inorganic metal oxides with high specific gravities. These colorants have been optimized for reflectivity in the visible range of the electromagnetic spectrum but are sub-optimum for infrared reflectance. Additionally, the better performing visible additive colorants absorb in the ultraviolet band of the electromagnetic spectrum. Low-cost sensors and cameras are increasingly available for multispectral imaging in agriculture, art, hunting, and warfare. There is a need to develop colorants that perform over a broad range of the electromagnetic radiation spectrum to conceal man made targets in a natural environment by better matching the light absorption and scattering characteristics of various backgrounds throughout the infrared, visible and ultraviolet portions of the electromagnetic spectrum.

SUMMARY OF THE INVENTION

The present invention represents a method for preparing core/shell particles, including:

a) forming a suspension of ethylenically unsaturated monomer droplets containing one or more monomers and a porogen in an aqueous medium containing a first stabilizer and a polymerization initiator, wherein at least one of the monomers is a cross-linking monomer, and wherein the first stabilizer is an inorganic colloid; and b) polymerizing the one or more monomers to form core/shell particles having a core of a porous polymer and a polymeric shell having a shell thickness of at least 5 nm, wherein any pores in the polymeric shell have a diameter of less than 2 nm.

This invention has the advantage that the resulting porous particles with an impermeable shell maintain their spectral properties when exposed to a liquid.

It has the additional advantage that the impermeable shell of the porous particles is formed using a simpler, easier to control process than for prior art impermeable porous particles.

It has the further advantage that the coatings using porous polymer particles will have a lower weight relative to coatings using additive colorants made of solid particles.

BRIEF DESCRIPTION OF THE DRAWINGS

FIG. 1 illustrates a camouflage coating in accordance with the present invention;

FIG. 2A is an SEM micrograph of an exemplary porous polymer particle with an impermeable polymer shell;

FIG. 2B is an SEM micrograph of an exemplary porous polymer particle without a polymer shell;

FIG. 2C is SEM micrograph of an exemplary coating including porous polymer particles with a polymer shell and a film forming latex;

FIG. 3 is a flowchart for a method of fabricating impermeable porous particles in accordance with an exemplary embodiment.

FIG. 4A illustrates a coating including porous particles having three different pore sizes;

FIG. 4B illustrates a coating including three different types of porous particles with corresponding pore sizes;

FIG. 4C illustrates a coating including porous particles having two different pore sizes, wherein a third pore size is provided by the voids between the porous particles;

FIG. 4D illustrates a coating including two different types of porous particles with corresponding pore sizes wherein a third pore size is provided by the voids between the porous particles;

FIG. 5 is a scanning electron microscope (SEM) micrograph of a porous polymer particle having three different pore sizes;

FIG. 6A illustrates a coating including porous particles dispersed in a binder with a subtractive colorant;

FIG. 6B illustrates a coating including porous particles having a subtractive colorant disposed on the surface of the pores;

FIG. 6C illustrates a coating including porous particles with a subtractive colorant in an underlying layer;

FIG. 6D illustrates a coating including porous particles with a subtractive colorant in an overcoat layer;

FIG. 7 is a graph comparing measured reflectance spectra for exemplary coatings;

FIG. 8A illustrates a coating including porous particles with pores which scatter radiation in the ultraviolet spectral band;

FIG. 8B illustrates a coating including UV-scattering porous particles having a multimodal size distribution to provide a low specular reflectance surface;

FIG. 8C illustrates a UV-scattering coating similar to FIG. 6A with an underlying layer including porous particles to control scattering and absorption characteristics in other portions of the spectrum;

FIG. 8D illustrates a low specular reflectance UV-scattering coating similar to FIG. 6C with an underlying layer including porous particles to control scattering and absorption characteristics in other portions of the spectrum; and FIG. 9 illustrates a multimodal particle size distribution.

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to “a particular embodiment” and the like refer to features that are present in at least one embodiment of the invention. Separate references to “an embodiment” or “particular embodiments” or the like do not necessarily refer to the same embodiment or embodiments; however, such embodiments are not mutually exclusive, unless so indicated or as are readily apparent to one of skill in the art. The use of singular or plural in referring to the various components of particles, coatings, layers and the like is not limiting. Unless otherwise indicated, the singular forms “a,” “an,” and “the” are intended to include one or more of the components (that is, including plurality referents). Unless otherwise explicitly noted or required by context, the word “or” is used in this disclosure in a non-exclusive sense.

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word “about”. In this manner, slight variations above and below the stated ranges can be used to achieve substantially the same results as the values within the ranges. In addition, the disclosure of these ranges is intended as a continuous range including every value between the minimum and maximum values, and unless otherwise indicated, the range end points as well.

As used herein, the term “reflectance” refers to the fraction of incident electromagnetic radiation that is reflected at an interface, for example at a coating interface.

It is an objective of the present invention to provide lightweight additive colorants for the ultraviolet (e.g., UVA, UVB), visible, infrared (e.g., NIR and SWIR) wavelength bands in the form of porous particles (e.g., porous polymer particles). In some embodiments, the particles provide ultraviolet and infrared reflectance for a given visible color that are characteristic of the natural environment when combined with the appropriate subtractive colorants. Some embodiments of the invention provide a broad-spectrum match to daylight sky using porous particles in atmospheric emulation coatings.

The subject matter of this patent relates to the scattering of electromagnetic radiation in various portions of the electromagnetic spectrum. Within the context of the present disclosure, the following terminology will be used to refer to various wavelength bands (also referred to synonymously as "spectral bands"). The ultraviolet (UV) wavelength band includes radiation having wavelengths in the interval from 10 to 400 nm. The portion of the UV wavelength range that is of primary interest in camouflage applications is 250 to 400 nm. UVA (315 to 400 nm), UVB (280 to 315 nm) and UVC (100 to 280 nm) are designations commonly used to refer to portions of the ultraviolet wavelength band. The visible wavelength band includes radiation having wavelengths in the interval from 400 to 700 nm. The near-infrared (NIR) wavelength band includes radiation having wavelengths in the interval from 700 to 1000 nm. The short-wave infrared (SWIR) wavelength band includes radiation having wavelengths in the interval from 1000 to 3000 nm. The mid-wave infrared (MWIR) wavelength band includes radiation having wavelengths in the interval from 3000 to 8000 nm. The long-wave infrared (LWIR) wavelength band includes radiation having wavelengths in the interval from 8000 to 15000 nm. The far infrared (FIR) wavelength band includes radiation having wavelengths in the interval from 15000 to 100,000 nm.

The term colorant refers to any material or addenda added to a composition for the purpose of modifying the reflectance. Colorants may be neutral (i.e., achromatic) such that they modify the reflectance of the composition in a substantially uniform manner over a spectral region of interest, or colored (i.e., chromatic) such that the reflectance varies as a function of wavelength within the spectral region of interest.

Colorants can be additive, subtractive, or both additive and subtractive. Additive colorants reflect light in the spectral region of interest thereby adding light to that reflected from an underlying substrate. The reflectance may be achieved by light scattering, diffraction, or constructive interference in a structural colorant. The reflectance characteristics will typically vary as a function of wavelength and are generally related to the ratio between the size of the colorant particle and any internal structures (e.g., pores) to that of the wavelengths in the spectral region of interest. Subtractive colorants remove light by absorption of light passing through a coating, and thus subtract light from that reflected by the substrate. The absorption characteristics of the colorant will typically vary as a function of wavelength within the spectral region of interest, thereby controlling the color of the reflected light. A subtractive colorant is said to be a broad-band colorant when it absorbs strongly across multiple wavelength ranges of interest.

Some additive colorants scatter light due to a mismatch between the refractive index of the colorant particles and that of the materials that they are dispersed within. Commonly used scattering colorants for the visible spectrum include titanium dioxide and zinc oxide. A mismatch in the refractive index of air to the solid matter of porous particles can also act as an additive pigment such that the air-filled pores can be thought of as an additive colorant particle.

The optimum size of the additive colorant particles and pores is related to the first maximum in the Mie scattering while taking into account the number of scattering sites per unit volume at a specified porosity. For porous polymer particles having a porosity less than 35% where the pores are much smaller than the particle and the effective medium refractive index is estimated by the Maxwell-Garnett equation the peak Mie scattering occurs when the ratio of the pore diameters d to the wavelength is in the range $1.0<d/\lambda<1.4$. At higher porosities, the lower effective refractive index shifts the peak scattering toward larger pore diameters. This shift is offset by the decreasing size of the polymer structures between pores that scatter light to high angles.

The greatest amount of light is removed from transmission by scattering at the peak wavelength for Mie scattering. However, much of the light is scattered in the forward direction and the reflected light from additive colorants is better characterized by light that is scattering in the back direction using the Kebelka-Munk scattering coefficient S. This coefficient may be estimated from Mie theory by:

$$S = \frac{C_{sca}(1-g)}{v}$$

where $C_{sca}$ is the scattering cross section of the pore or particle computed from Mie theory, g is an asymmetry parameter, and v is the volume of the scattering entity. The asymmetry parameter g is defined by:

$$g = \langle \cos(\theta) \rangle = \frac{1}{k^2 C_{sca}} F(\theta, \phi) \cos(\theta) \sin(\theta) d\theta d\phi$$

$$g = \langle \cos(\theta) \rangle = \frac{1}{k^2 C_{sca}} \int \int F(\theta, \phi) \cos(\theta) \sin(\theta) d\theta d\phi$$

where $k=2\pi/\lambda$, $F(\theta,\phi)$ is a dimensionless phase function computed from Mie theory, $\theta$ is the angle in the scattering plane from forward direction to the observer, and $\phi$ is the angle of rotation around the axis of the incident light path. The maximum scattering coefficient S occurs at $d/\lambda$ of about 0.5 when taking into account the number of pores per unit volume of particle at a specified porosity. This ratio decreases slightly with increasing porosity. For 50% porous polymer particles, the maximum S occurs at a $d/\lambda$ ratio of 0.45. The peak is broad with half the peak height value at $d/\lambda$ ratios of 0.22 and 1.4.

For longer wavelength bands, the optimum size of the scattering site d becomes larger and for solid additive colorants, many of which have a high specific gravity, this contributes additional weight to the coating. Coatings using porous particles having pores filled with air have the advantage that they will have a lower weight to provide the equivalent scattering effect.

Within the context of the present disclosure, the term "light scattering effective pore size" is defined to be the size of a mono-sized pore having the same scattering into the back hemisphere at a specified wavelength of light as that of the distribution of pores having the same at the same porosity.

Within the context of the present disclosure, the term "scattering opacity" is defined to be the ability of an opacifying layer to prevent the transmission of electromagnetic radiation in a specified wavelength range due to scattering in the back direction and is related to Mie scattering by the asymmetry parameter. Within the context of the present disclosure, the term, "Transmittance" is 100% minus the "scattering opacity."

Additive colorants typically have broader spectral peaks than subtractive colorants, but they may be scattering in some bands and transparent or absorbing in other bands of interest. For example, titanium dioxide particles that have been optimized for use in paints typically act as a subtractive colorant in the ultraviolet wavelength band, as an additive colorant in the visible wavelength band, and are nearly transparent in the longer wavelength infrared wavelength band. Monodispersed particles will produce multiple scattering wavelength maxima to produce additional multispectral colorant effects.

Multispectral requirements may require the use of additive colorants that are transparent in a wavelength range different from the wavelength range where the colorants are needed, for example a wavelength range where a low reflectance is achieved through a subtractive colorant. Another example is where the desired reflectance is achieved in an underlying layer. An additive colorant may be transparent to wavelength $\lambda_0$ if $d/\lambda_0<0.2$ and preferably $d/\lambda_0<0.1$ where the pores of size d are useful as an additive colorant for wavelengths less than $\lambda_0/2$. Under this condition, the pores are too small to scatter a significant amount of radiation at wavelength $\lambda_0$ for coating levels that are effective at scattering radiation at wavelengths smaller than $\lambda_0/2$. An additive colorant may be effective at wavelengths larger than $\lambda_0$ provided that $d/\lambda_0>5$ and preferably $d/\lambda_0>10$. Under this second condition, much of the light scattered from the additive colorant is scattered in the forward direction and contributes little to the reflectance. When this second condition is met, the additive colorant is useful for wavelengths greater than $2\lambda_0$.

Another form of additive colorant is a structural colorant where constructive and destructive interference amplifies or eliminates scattering to produce a narrower wavelength range of reflectance than a purely scattering colorant. This narrower wavelength range is obtained by orienting large flake pigments with the flake having a lower refractive index core (e.g., amorphous silicon dioxide) and a higher refractive index coating (e.g., titanium dioxide) where the core and coating thicknesses are designed to obtain constructive interference at a desired wavelength normal to the surface. The relationship of the core and coating thicknesses is given by diffraction theory and produces multiple scattering wavelength maxima to produce additional multispectral colorant effects.

Additive colorants can be used to amplify the absorption of light by subtractive colorants. The additive colorant can increase the opacity and hiding power of a coating containing a subtractive colorant. This results from electromagnetic radiation passing through the coating being scattered by the multiplicity of interfaces with refractive index discontinuity between the different phases in the colorant and with matrix polymer. The back scattered electromagnetic radiation can again be scattered and returned in the direction of the incident electromagnetic radiation. The path of the light through the coating is increased by the multiple scatterings thereby increasing the probability that the light is absorbed by the subtractive colorant.

Fluorescent dyes and pigments may also be considered combination multispectral colorants when ultraviolet is a wavelength band of interest. The absorption of UV light is a subtractive colorant effect while the emission of visible light is an additive colorant effect. Similarly, some fluorescent substances absorb blue visible light and emit in the near-infrared band.

Unless otherwise indicated, the term "porous particle" is used herein to refer to polymeric materials useful in the multispectral camouflage coating compositions essential for the present invention. The porous particles generally comprise a solid continuous polymeric particle having an external particle surface and internal regions absent of solids that form pores when dried. The pores may be discrete compartments dispersed within the continuous solid phase isolated by polymer walls, interconnected compartments absent continuous walls, or networks of space between connected a network of polymer nodules.

Unless otherwise indicated, the term "non-porous" is used herein to refer to particles that are not designed to have discrete compartments within the solid continuous polymeric phase. Preferably less than 5% of the total volume of the non-porous particles consists of pores.

The polymeric material of the porous particles is generally non-porous and has the same composition throughout that phase. That is, the polymeric material is generally uniform in composition including any additives (for example, colorants or additives) that can be incorporated therein. In addition, if mixtures of polymers are used in the polymeric material, generally those mixtures are dispersed uniformly throughout.

The term "porogen" refers to a pore forming agent used to make porous particles for use in the present invention. In some embodiments, the porogen can be the aqueous phase of water-in-oil emulsions (that is the first aqueous phase of a water-in-oil-in-water emulsion), the pore stabilizing hydrocolloid, or any other additive in the aqueous phase that can modulate the porosity of the porous particles. In other embodiments, the porogen can be a diluent that is a solvent or mixtures of solvents for monomers but is not a solvent for the polymer formed in the emulsion polymerization type of limited coalescence process.

The term "size" as used herein to refer to particles or to internal pores within the particles corresponds to the modal or average diameter of the particles or the internal pores.

The porous particles can include "micro", "meso", and "macro" pores, which according to the International Union of Pure and Applied Chemistry, are the classifications recommended for pore sizes of less than 2 nm, from 2 to 50 nm, and greater than 50 nm, respectively. In some configurations, porous polymer particles having two or more distinct pore morphologies can be used.

For spherical pores, this average pore size is an "average diameter". For non-spherical pores, the average compartment size refers to the "average largest dimension." Average pore size can be determined by analyzing scanning electron microscopy (SEM) images of porous particles prepared by freeze fracture or cryo-face-off sectioning using a commercial statistical analysis software package to study the distribution of the pores within the particles, or by manually measuring the pore diameters using the scale in the SEM images. For example, the average pore size can be determined by calculating the average diameter of at least 200 measured pores in a single porous particle. The Saltykov method may be applied to correct the particle size when the fracture or cryo-face-off section surface forms a plane and the pores are spherical. Alternatively, the spectral response of the reflectance of a coating may be fit to one or more effective pores sizes using the Mie estimate of the Kebulka-Munk scattering parameter S described above and is preferred for open networks of pores.

The porous particles used in this invention preferably have porosity of between 10% and 60%, or more preferably between 10% and 50%, all based on the total porous particle volume. Porosity can be measured by the well-known mercury intrusion technique for more brittle polymers where complete crushing of the porous particle occurs before the maximum pressure is achieved. The porosity of particles not fully crushed by mercury intrusion can also be evaluated from the apparent density of the particles. One method is to measure the buoyancy point using different density liquids, provided that the liquids do not penetrate the particle and fill the pores. Another measurement method is to determine the apparent density from the drag coefficient at a given particle size. This can be done by sedimentation techniques in liquids provided that particle in impervious to the liquid. The drag coefficient can also be determined in a gas. One useful device is the Aerosizer DSP Particle Sizer Analyzer 3225 which was formerly made by TWI, Inc. of Shoreview, MN, in which the apparent density applied to the measurement is adjusted so that the modal sizes form this device matches that of one measure the size using a device such as a Coulter Counter.

The term "matrix polymer" is used herein to refer to polymers that are present in coating formulations (and opacifying layers) that hold the porous particles within the dried layer and give it integrity and flexibility.

The term partition coefficient "Pa/b" refers the ratio of concentration of a compound in phase a to that in phase b in a mixture of two immiscible solvents a and b when at equilibrium.

The term "Log Po/w" is the logarithm base 10 of the concentration of a monomer in octanol to that in water at equilibrium.

The modulation transfer function (MTF) of an optical system describes the fraction of the modulation or contrast amplitude preserved by the optical system as a function of spatial frequency.

Camouflage Coatings

Embodiments of the present invention are useful to provide camouflage surfaces having controlled scattering characteristics in specified wavelength bands in order to blend in with various types of backgrounds. FIG. 1 illustrates an article 100 including a camouflage coating 120. While the camouflage coating 120 can be "free-standing" and used as the only layer or structure in the article, in many embodiments, the camouflage coating is disposed over a surface 110 of a substrate 105. The coating 120 includes porous particles 125 dispersed within a binder 130. The porous particles 125 have pores 140 having specified pore size distributions as will be described later. In some exemplary embodiments, the porous particles 125 have an impermeable shell 135 which is substantially impermeable to liquid (e.g., water), where the term "shell" refers to the external surface of the particle. The impermeability is an important attribute for many camouflage applications because the camouflaged articles are often utilized in environments where the surface will be exposed to rain and other sources of moisture. Within the context of the present disclosure, the term "substantially impermeable" means that the shell 135 of the particle 125 prevents the penetration of the shell by water to cause loss of light scattering performance for the duration of the mission or the exposure to moisture before a drying event.

In an exemplary embodiment, the porous particles 125 are porous polymer particles, although other types of porous particles could also be used. In some embodiments, one or more underlying layers 150 can optionally be provided between the coating 120 and the substrate 105. In some embodiments, one or more overcoat layers 155 can optionally be provided over the coating 120. For example, the overcoat layer 155 can be a low-specular reflectance surface layer such as those described in commonly-assigned U.S. Patent Application Publications 2020/0199373, 2020/0199379 and 2020/0199381 to Lofftus, each of which is incorporated herein by reference. The article 100 can be any object which it is desired to camouflage including clothing and military equipment. The spectral scattering characteristics (i.e., the wavelength dependent scattering characteristics), together with the absorption characteristics of the materials (e.g., colorant materials such as dyes or pigments) in the coating 120 and other layers, provide a camouflage surface having an appearance that is similar to a specified background when viewed visually or using appropriate multispectral imaging systems in order to mask detection or identification of a camouflaged object.

Porous Polymer Particles

In some exemplary embodiments, the porous particles 125 are porous polymer particles. For some pore morphologies, the pores are substantially spherical and are isolated from other pores within the particle to form closed or un-networked pores. In an exemplary embodiment, such pore morphologies are fabricated using an aqueous porogen. The size of the particle, the particle formulation, and the manufacturing conditions are the primary controlling factors for the pore size for the un-networked or closed pore morphology made using a water porogen. Typically, such pores have an average diameter size of between 100 nm and 4 μm, or more typically between 200 nm and 2 μm. In an exemplary embodiment, such particles can be fabricated using the methods described in commonly-assigned U.S. Pat. No. 7,754,409 to Nair et al., U.S. Pat. No. 7,887,984 to Nair et al., U.S. Pat. No. 7,888,410 to Nair et al., U.S. Pat. No. 8,252,414 to Putnam et al., U.S. Pat. No. 8,329,783 to Nair et al., and U.S. Pat. No. 9,376,540 to Boris et. al. each of which are incorporated herein by reference. The patents describe porous polymer particles that are made by a multiple emulsion process. The multiple emulsion process provides formation of individual porous particles having a continuous polymer phase and multiple discrete internal pores, with the individual porous particles being dispersed in an external aqueous phase. The described Evaporative Limited Coalescence (ELC) process is used to control the particle size and distribution, while a hydrocolloid is incorporated to stabilize the inner emulsion of the multiple water-in-oil-in-water (WOW) emulsion that provides the template for generating the pores in the porous particles.

Another method of making polymer particles is known as polymerization limited coalescence (PLC) as described in commonly-assigned U.S. Pat. No. 5,563,226 to Muehlbauer et al. and U.S. Pat. No. 9,683,064 to Rollinson et al., which are incorporated herein by reference. PLC enables polymer particle formation with compositions and very high molecular weights that are not soluble in solvents and amenable to the ELC process. The toughness of high molecular weight polymer particles made by the PLC process may be enhanced by cross-linking with di-functional and tri-functional monomers.

The PLC method may also be practiced on WOW double emulsions as described in commonly-assigned U.S. Pat. No. 8,703,834 to Nair et al., which is incorporated herein by reference. Levels of cross-linking monomers include 1% to 100% cross-linker. Low levels of cross-linking produce solvent swellable particles while high levels produce hard, abrasion resistance particle useful as media for milling pigments as described in in commonly-assigned U.S. Pat.

No. 5,478,705, which is incorporated herein by reference. For tough particles, 10% or more cross-linking monomer is required to prevent swelling in solvents while less than 90% to prevent brittle fracture.

The pores in particles made by a WOW reside uniformly throughout the particle. Pores near the surface have thin walls that are susceptible to breakage allowing penetration of the pore by water and resulting in the loss of light scattering functionality useful in color and opacifying applications. Additionally, thin walls may be penetrated by molecular diffusion of water through the free volume of the polymer slowly filling the pores with water and resulting in the loss of light scattering functionality. The effect is amplified in high porosity particles where the walls both on the surface of the particle and between particles have been stretched to the point of breaking during the dilution step before evaporation of polymerization. This deficiency is addressed by a core-shell morphology with a shell having much greater thickness than forms between the pores within the core and the surface of the porous particle. Commonly-assigned U.S. Pat. No. 8,940,362 to Massa et al., which is incorporated herein by reference, discloses a ELC WOW method of collapsing the pores at the surface to create a non-porous shell around porous core. It relies on using a second organic solvent that is miscible with both water and the first solvent but is not a solvent for the polymer. This second organic solvent is added to the second water phase and ELC WOW after the second emulsification step but before removing the solvent. This approach cannot be used for the PLC WOW method since no polymer has formed until after polymerization has occurred and there is not a first organic solvent to dissolve polymer formed during polymerization.

Another type of pore morphology is formed in particles that are composed of a network of substantially spherical nano-scale sub-particles which connect together in random, or pseudo random, chains. The openings between the sub-particles form an open network of interconnecting pores. In an exemplary embodiment, particles with such pore morphologies can be fabricated using an organic porogen using the process described in commonly-assigned U.S. Pat. No. 6,726,991 to Keading et al., which is incorporated herein by reference. This patent discloses porous polymer particles formed using a diluent solvent in the oil phase acts as a porogen in a diluent-oil-in-water (DOW) emulsion using a polymerization limited coalescence (PLC) process. The porous polymer particles described in this patent have a core shell architecture where the shell is an inorganic stabilizer and the porous particles having a median diameter of less than about 50 μm.

It is found that particle sizes larger than about 50 μm can be made using a second stabilizer poly(2-ethyl-2-oxazoline) as disclosed in commonly-assigned U.S. Pat. No. 9,683,064 to Rollinson et al., which is incorporated herein by reference. It is also found that a polymer shell in a core-shell morphology as described in U.S. Pat. No. 6,726,991 is formed for certain monomers. For these monomers, an impermeable polymer shell is formed on a tough, high molecular weight, and optionally cross-linked porous particle. The shell thickness is governed by the monomer and diluent solubilities in water. Increased shell thicknesses are obtained for increasing solubility of the monomer in water. For example, styrene and divinyl benzene have very low water solubilities and no polymer shell forms while a polymer shell that is about 5 nm in thickness forms for the slightly water-soluble (1.5%) monomer methyl methacrylate (MM) at 50% with 50% trimethylolpropane triacrylate (Tmpta). The water solubility of ethyl acrylate monomers is slightly more than MM monomer while that of methyl acrylate (MA) is about 5%. Polymer shells of about 5 nm form for 50% ethyl acrylate 50% Tmpta and polymer shells of about 10 nm form for 50% MA 50% Tmpta. The polymer shells are non-porous for particles made with methyl and ethyl acrylates providing resistance to loss of performance when pores become filled with water (e.g., when exposed to rain).

Figure 2A:
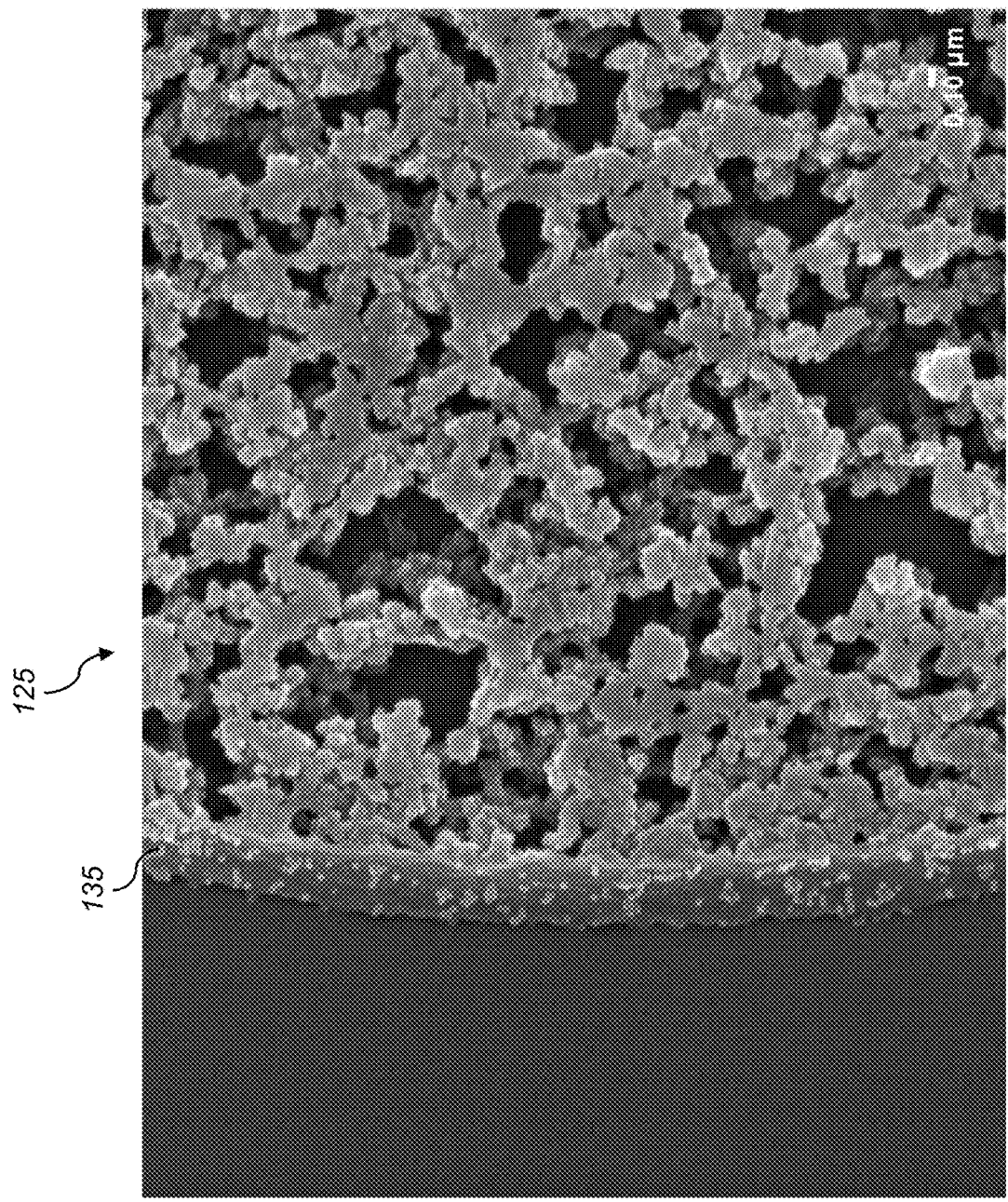
Figure 2B:
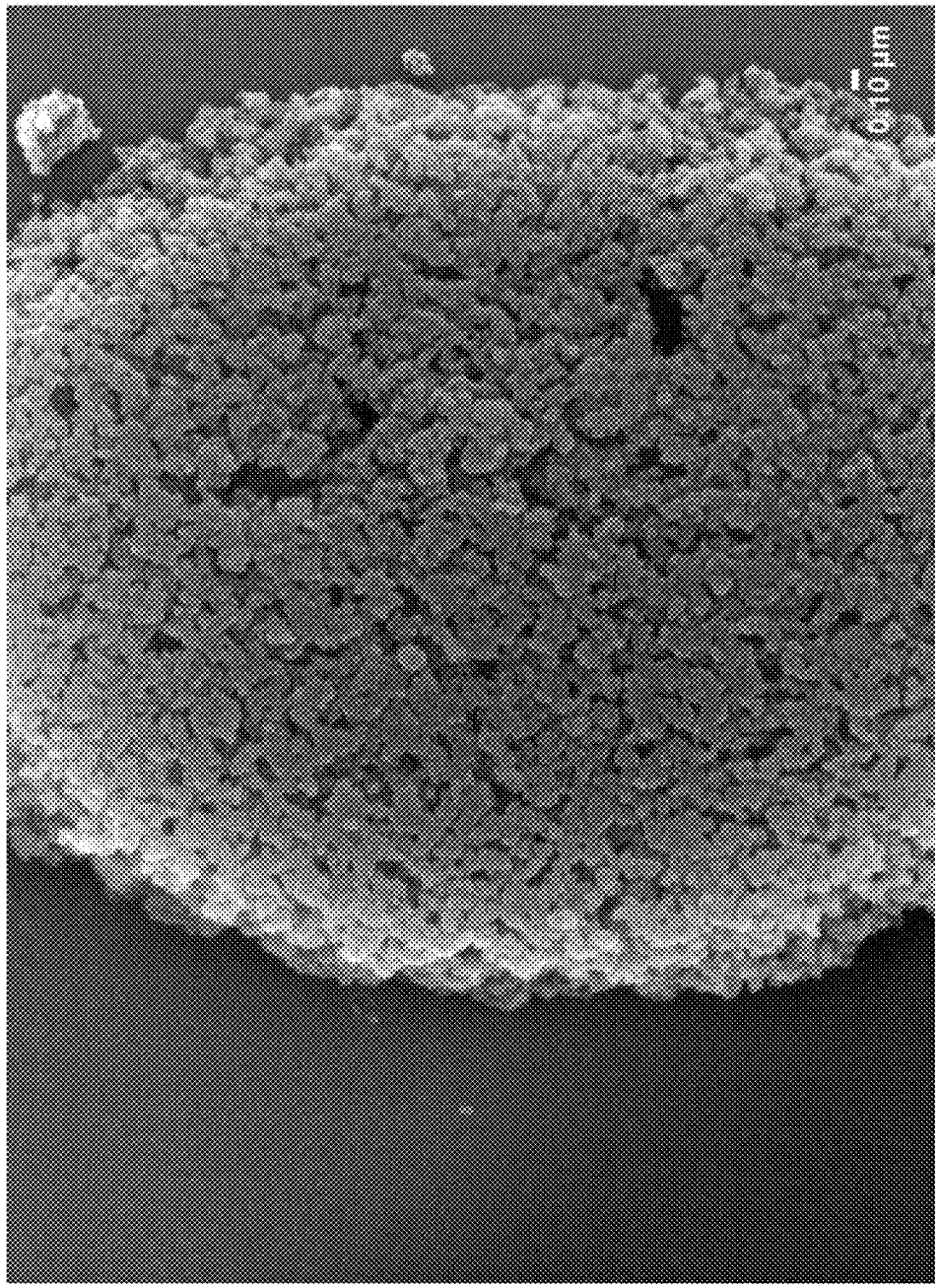

FIG. 2A shows an SEM micrograph of a cryo-face-off section of porous particle 125 having an impermeable shell 135 (corresponding to Porous Particle P10 described below). The illustrated porous particle 125 is a 35% porous particle having 50% MA and 50% Tmpta, where the diluent was 5% ethyl acetate and 95% cyclohexane and the colloidal silica is mostly lost during the cyro-face-off sectioning. FIG. 2B shows an SEM micrograph of a cryo-face-off section of a comparative porous particle 125 having no impermeable shell (corresponding to Porous Particle P11 described below) made using the process described in U.S. Pat. No. 6,726,991. The illustrated porous particle 125 has 40% styrene and 60% divinyl benzene with 55% difunctional activity made by the DOW PLC method at 1-to-2 monomer-to-diluent ratio where the diluent comprised 25% cyclohexanol and 75% toluene.

The octanol water partition coefficient Po/w, a commonly reported property for a monomer, is closely related to its water solubility and more closely predicts the propensity of a monomer to form a polymer shell in the limited coalescence process. Log Po/w values below 2.0 and preferably below 1.5 for the majority monomer of the starting composition are useful for creating polymer shells. Useful monomers for forming polymer shells in PLC include methyl methacrylate, methyl acrylate, ethyl acrylate, 2-hydroxyethyl acrylate, hydroxymethyl methacrylate, 1-hydroxyethyl methacrylate, 2-hydroxyethyl methacrylate, 1-hydroxypropyl methacrylate, 2-hydroxypropyl methacrylate, 3-hydroxypropyl methacrylate, 1-hydroxybutyl methacrylate, 2-hydroxybutyl methacrylate, 3-hydroxybutyl methacrylate, 4-hydroxybutyl methacrylate, methyl 2-(methoxymethyl) acrylate, 2-methoxyethyl acrylate, 2-ethoxyethyl acrylate, methyl 2-(hydroxymethyl)acrylate. Useful cross-linkers with Log Po/w below 2 include ethylene glycol diacrylate, 1,3-proanediol diacrylate, and ethylene glycol dimethacrylate.

The polymer shell thickness can be increased using a diluent that has some water solubility. The water solubility of the monomer is enhanced by the presence of a solvent in the water phase. For example, ethyl acetate is soluble in water at about 8% and lowers Log Po/(w+solvent) for the PLC system.

The diluent solvent may be a single solvent or a combination of solvents. It has been found that combinations of polar and nonpolar solvents can provide a network of open meso pores to scatter UV and blue radiation interspersed within low density regions of polymer (or open voids) that are generally spherical in shape and act as macro pores to scatter VIS, NIR and SWIR radiation. The size and quantity of the macro pores decreases with decreasing nonpolar solvent and may be eliminated altogether to prove a UV scattering additive colorant.

To be impermeable, the composition of the polymer shell must also prevent diffusion of water through the polymer. All amorphous polymers exhibit the property of free volume, the space between randomly packed polymer chains through which small molecules may diffuse. The free volume is essential frozen in polymers below glass transition temperatures $T_g$ and diffusion will be slow. The transition for the glassy state below $T_g$ to the rubbery state above $T_g$ typically occurs over a range of 10° C. In the rubbery state, the polymer chains are moving due to the thermal vibrations and the free volume becomes mobile, allowing rapid diffusion of small molecules. To be impermeable to water, the polymer $T_g$ onset must be above the operating temperature of the coating and there should be no hydrogen bonding.

Depending on the composition of the polymer and small molecule, there may be an attractive force that allow the particle to absorb the small molecule creating a solvent effect. The absorbed molecule separates the polymer chains allowing movement by thermal energy and effectively lowering the $T_g$ and rapid diffusion of the small molecule through the polymer. For water, the greatest attractive force is hydrogen bonding, and polymer compositions that do not hydrogen bond provide the greatest impermeability to water.

Binder Material

The multispectral camouflage coatings of this invention also includes a binder 130 in which the porous particles 125, and optional tinting colorants are dispersed. In an exemplary embodiment the binder material is a matrix polymer. In some embodiments, the matrix polymer may include a mixture of polymers. The matrix polymer can be chosen so that it is flexible for applications where the substrate must bend such as clothing or laminates to be applied to curved surfaces. For application on hard surfaces, the matrix polymer may be hard to increase the coating durability.

It is particularly useful that the matrix polymer (i.e., the binder material): (a) is durable and either flexible or hard depending upon the application; (b) is capable of forming a stable coating composition with the porous particles, colorants and any other additives such as UV light stabilizers; (c) is capable of being coated by techniques practiced in the art; (d) has film-forming properties when applied to a substrate; (e) is capable of being dried and where desired also crosslinked; (f) has good light and heat stability; and (g) provides additional barrier to penetration of porous particles by liquids.

In some embodiments, the matrix polymer provides an article on a substrate that has good durability to laundering and can be tailored to size by sewing. Additionally, the matrix polymer can provide a supple feel to touch referred to as good hand and flexibility including drape especially when coated over a fabric. In other embodiments, the matrix polymer provides an article on a substrate that has good durability to abrasion, water barrier properties, and high adhesion to hard surface such as metals and plastics. Thus, the matrix polymer is useful in the multispectral camouflage coating composition for binding together and adhering the porous particles and all colorants onto the substrate.

The matrix polymer can include one or more organic polymers that are film forming and can be formed as a suspension or emulsion or in solution. It can include polymers that are not crosslinking and to which additional crosslinking agents are not added, or it can include polymer to which crosslinking agents are added and are thus capable of being crosslinked under appropriate conditions.

One type matrix polymer that can be used is a thermal set acrylic latex dispersion for water-based coating systems with no unsaturated bonds for greater resistance to photo-oxidation when exposed to sunlight. Other useful matrix polymers include but are not limited, to poly(vinyl acetate), poly(vinyl pyrrolidone), ethylene oxide polymers, polyurethanes, urethane-acrylic copolymers, other acrylic polymers, styrene-acrylic copolymers, vinyl polymers, and polyesters, silicone polymers or a combination of two or more of these organic polymers. Such matrix polymers are readily available from various commercial sources or prepared using known starting materials and synthetic conditions. The matrix polymer can be anionic, cationic or nonionic in total charge. A useful class of film-forming matrix polymers includes aqueous latex polymer dispersions such as acrylic latexes that can be ionic or nonionic colloidal dispersions of acrylate polymers and copolymers. Film-forming aqueous latexes suitable for use include acrylic latexes, urethane latexes, styrene-butadiene latexes, poly(vinyl chloride) and poly(vinylidene chloride) latexes, poly(vinyl pyridine) latexes, and poly(acrylonitrile) latexes.

Figure 2C:
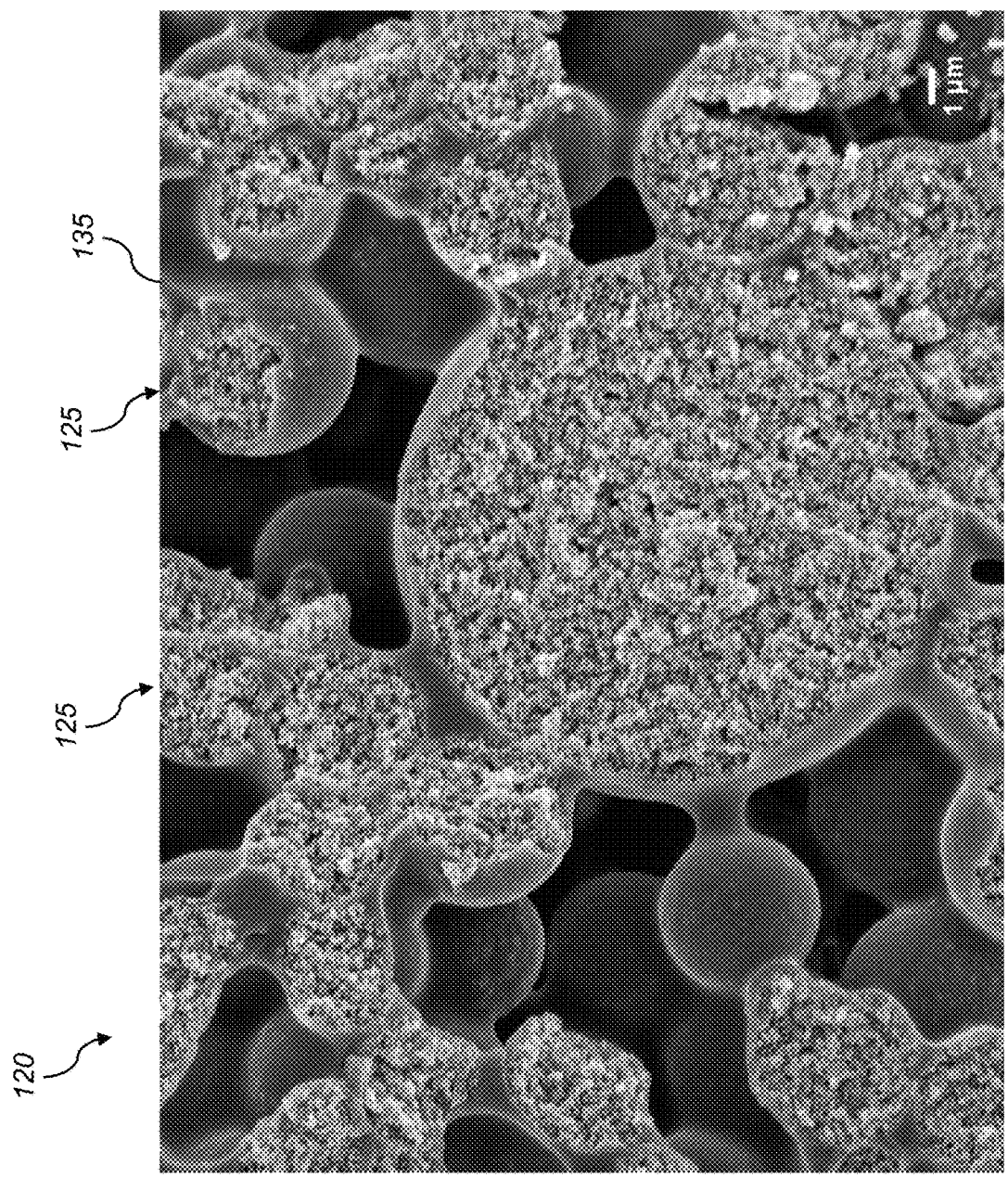

Latexes are particularly useful in forming impermeable shells on porous particles with shells that may have a micro pore structure. The colloidal size of the latex polymer is much greater than that of the micro pores in the porous particle shell and the latex polymer is prevented from penetrating and filling the porous particle. The film-forming latex polymer coats the exterior of the particle, increasing the shell thickness and sealing any micro pores. FIG. 2C shows a freeze-fracture SEM micrograph of an exemplary coating 120 showing the enhanced impermeable shell 135 obtained in coatings including porous particle 125 having a polymer shell and a film forming latex where the matrix polymer to porous particle volume is 1 to 4.

In some embodiments including textile substrates, the matrix polymer generally has a glass transition temperature $T_g$ that is less than 25° C. and more likely equal to or less than 0° C. in order to make the dry multispectral camouflage coating flexible, rubbery, and crack-free. The glass transition temperature can be determined using known procedures and such values are already known for many polymers useful in this invention. The matrix polymer preferably has adequate flexibility and tensile strength in order to maintain integrity upon handling, especially fabric-based applications where good drape, hand, and other tactile properties are required.

In other embodiments including inflexible or hard substrates, the matrix polymer may have a $T_g$ greater than 30° C. and preferable greater than 50° C. for coatings on substrates such as metal and plastics. The high $T_g$ of the matrix polymer provide strength, resistant to abrasion, and creep. Additionally, the high $T_g$ of a matrix polymer added to the porous polymer shell as shown in FIG. 2C further increases resistance to penetration by water.

In yet other embodiments, the aromatic content of the matrix polymer and porous polymer particles should be minimized to reduce the number of unsaturated bonds that undergo photo-oxidation and discoloration when exposed to sunlight. Matrix polymer with aromatic content may provide mechanical or chemical advantages such as scratch resistance and water impermeability when included in the topmost multispectral camouflage coating 120. The aromaticity should not exceed 10% of the combined coating 120 and any underlying layers 150 that rely in porous particles as additive colorants. The aromatic content may be concentrated in the topmost coating to enhance the surface properties of the multispectral camouflage coating.

The matrix polymer can optionally be crosslinked with a crosslinking agent that is included in the multispectral camouflage coating formulation and which is activated chemically with heat, radiation, or other means in order to provide enhanced integrity and wash durability of the resulting article. The crosslinking agent serves to provide improved insolubility of the multispectral camouflage coating in water and adhesion to the substrate or optional underlying layer. The crosslinking agent is a chemical having functional groups capable of reacting with reactive sites on the latex polymer under curing conditions to thereby produce a crosslinked structure. Examples of suitable crosslinking agents include multi-functional aziridines, aldehydes, and epoxides.

Drying and optional crosslinking of the matrix polymer in the multispectral camouflage coating formulation can be accomplished by suitable means such as by heating, and various mechanisms can be employed for crosslinking the matrix polymer. For example, the crosslinking can involve condensation or addition reactions promoted by heat or radiation. In one embodiment, a latex composition is used as the matrix polymer. Upon heating, the latex film dries, with a crosslinking reaction taking place between the reactive side groups of the polymer chains. If the particular latex polymer used is not itself heat reactive, then suitable catalysts or crosslinking agents can be added to promote crosslinking upon heating.

In addition, the matrix polymer provides control of the void spacing (interstitial voids or volume) among porous particles. Commonly assigned U.S. Pat. No. 9,891,350 teaches the interstitial void is preferably at least 5% to provide the greatest light blocking capacity. The size of the interstitial voids is defined by the size distribution of the porous particle and may be as large as 40% of the porous particle for low interstitial volumes and greater than the porous particle size for high interstitial void volume. Such large pores are effective for scattering of longer wavelengths and may be part of the design in some embodiments or undesirable in other embodiments where high transmittance at these wavelengths is needed.

The interstitial voids may become connected above a percolation threshold of about 5 to 10% allowing moisture vapor and water to penetration the coating. In some embodiments, connected interstitial voids provide breathability in camouflage garments. Light scattering at the longer wavelengths is reduced and lost when the connected interstitial voids are filled with water. Additionally, the amplification provided by the interstitial voids of the light blocking at shorter wavelengths is lost. Reduced light block of the camouflage coating 120 resulting in greater transmittance to underlying layer 150 and a change in color properties of the camouflage. Furthermore, water in the interstitial voids expose the internal porous particles to water which may absorb the water unless made impervious by a polymer shell formed on the particle or with the matrix polymer as shown in FIG. 2C. To minimize penetration of the coating by water, it is desirable to limit the volume of the interstitial voids not filled with binder to be no more than 10%, and preferably to be no more than 5%.

The amount of matrix polymer required to reduce the interstitial void volume to less than 5% depends upon the random packing density of the porous particles. The random packing density varies the polydispersity and shape of the porous particle. It is greater for spherical particles but less for narrow particle size distributions such as those produced by LC processes. The random packing density of the LC porous particles can be increased to reduce the amount of matrix polymer required by using two or more sizes of particles where the ratio of particle sizes is about 2.

The matrix polymer is typically present in the multispectral camouflage coating in an amount of at least 25 volume % and up to and including 50 volume %, or more typically at least 30 volume % and up to and including 45 volume %. The weight % of the matrix polymer based on the total dry weight of the multispectral camouflage coating (that is, total layer solids) to obtain the desired volume % depends upon the porosity of the particles. For example, to obtain 25 volume % matrix polymer, 29 weight % is needed for particles with 10% porosity while 57 weight % is needed for 60% porosity. For 50 volume % polymer, 55 weight % matrix polymer is needed for particles with 10% porosity while 80 weight % is needed for 60% porosity.

Substrates

The substrates 105 onto which the multispectral camouflage coatings of the invention, and optionally one or more underlying layers 150, are formed or disposed can include various woven and nonwoven textile fabrics such as nylon, polyester, cotton, glass, aramide, rayon, polyolefin, acrylic wool and felt, polymeric films, cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], adhesive laminates such as 3M™ Wrap Film Series 1080, paper or other cellulosic materials, canvases, wood, metals, plaster and other materials that would be apparent to one skilled in the art. The substrates can vary in thickness, suitable for the desired application. Particularly useful substrates comprise a textile web, adhesive laminate, metalized polymer, cellulosic material, glass, or ceramic. Textiles and fabrics are useful for articles such as clothing, tarpaulins, and tents, while adhesive laminates are more useful for changeable camouflage of equipment such as trucks, tanks, and aircraft.

Various substrates 105 including polymeric films, adhesive laminates, textiles, and cellulosic substrates can be surface treated by various processes including corona discharge, glow discharge, UV or ozone exposure, flame, or solvent washing in order to promote adhesion of coating compositions.

The thickness of the substrate 105 is not critical and can be designed for a given use of the resulting article. In typical embodiments, the dry substrate thickness is at least 50 μm.

Underlying Layers

Depending upon the particular application being considered, the article 100 of the present invention can further include one or more underlying layers 150. In some embodiments, the underlying layers 150 can include one or more of a multispectral base color layer, a coloration pattern layer, a barrier layer, a thermal management layer, or a primer layer, and an adhesion-promotion layer to promote the adhesion of the multispectral camouflage coating 120.

A multispectral base color layer can be used to provide additive or subtractive coloration in spectral bands where the camouflage coating 120 is transparent. The base color must be compatible with the coloration of any coloration pattern layers in the spectral range where the colorant contained therein are active in absorbing or scattering electromagnetic radiation. For example, a broad band black subtractive colorant base layer comprising carbon to emulate deep space can be used under an additive colorant layer to emulate atmospheric scattering useful for camouflage of aircraft in daylight.

One or more barrier layers can be used to prevent migration of substrate components that act as subtractive colorants into any overlying layers. The $T_g$ and composition of the barrier layer must be chosen to prevent diffusion of the substrate component over the expected operating temperature. If applied over the base colorant layer, it must be transparent to wavelength bands where that base colorant is to provide a desired reflectance in the overall camouflage scheme. Barrier layers may also act a primer layer. For example, the barrier layer can be a barrier to UV absorbing oils added to vinyl laminate substrates to impart light stability to prevent polymer degradation by photo-oxidation when exposed to the UV components of sunlight.

In some embodiments, a coloration pattern layer can be a colorant receiver layer which is adapted to receive water-based inks. For example, the coloration pattern layer can be a coating on an appropriate fabric for print-on-demand camouflage printed with either continuous or drop-on-demand ink jet. In some embodiments, the colorant receiver layer can be the coating 120 which includes the porous particles 125 or can be an overcoat layer 155.

Subbing compositions for primer layers to promote the adhesion are well known in the art and any such compositions can be used. Some useful subbing compositions include but are not limited to polymers derived from vinylidene chloride such as vinylidene chloride/methyl acrylate/itaconic acid terpolymers and vinylidene chloride/acrylonitrile/acrylic acid terpolymers. These and other suitable subbing compositions are described in numerous publications and well-known in the photographic film coating art. A polymeric subbing layer can additionally be overcoated with a second subbing layer comprised of a gelatin (typically referred to as a "gel sub").

In some embodiments, primer layers with primer compositions that include electro-oxide under corona discharge treatment (CDT) can be used.

An adhesion-promotion layer can be disposed between the substrate 105 and the multispectral camouflage coating 120 to improve adhesion between the two materials, especially if the substrate 105 is a flexible textile material. The adhesion-promotion layer can be any material that maintains its flexibility and integrity and prevents cracking upon drying such as described above for the matrix polymers and in one embodiment can be the same as the matrix polymer used in the overlying opacifying layer. Particularly useful polymeric materials useful for forming the adhesion-promotion layer are polymers that provide the underlying layer with a glass transition temperature below 15° C. and preferably below that of the coldest temperature the at which the good flexibility is required. For example, such useful polymeric materials include but are not restricted to acrylic polymers, styrene-acrylic copolymers, vinyl polymers, polyurethanes, silicones, or a combination of two or more of these polymers, rubbers and latexes made from 1,3-butadiene, including, but not limited to styrene butadiene, polybutadiene, polychloroprene (Neoprene) and nitrile rubbers. Examples of suitable commercially available polymers for the underlying layer are those sold under the tradenames Butonal® NS175 (BASF) and Hystretch V43® (Lubrizol Corp.).

In some embodiments, coating layers may be treated such that they are made insoluble to subsequent coating vehicles by cross linking the polymer in the layer.

The layer formulations described herein can contain additives such as flame retardants, light stabilizers, preservatives, antimicrobials, biocides, surfactants, defoamers, and leveling and pH control agents, in order to achieve the desired properties of the layer formulations for application to the substrate or underlying layers provided the additives do not act as subtractive colorants at wavelengths where high reflectance is desired. It is desirable that the various layer formulations have good wetting and film-forming properties. Materials such as silicones can be incorporated into the formulations to aid in leveling them on the surface of the substrate or any underlying layer to provide a smooth finish.

Overcoat Layers

Various types of overcoat layers 155 can be useful in different embodiments. The overcoat layers can provide various functions such as added durability and control of specular reflections.

In some multispectral camouflage applications, the low specular reflectance coatings disclosed in the aforementioned commonly-assigned U.S. Patent Application Publications 2020/0199373, 2020/0199379 and 2020/0199381 to Lofftus are useful as overcoat layers. These coatings include a plurality of protruding substantially spherical caps having a multimodal size distribution 200 (see FIG. 9). In some embodiments, the spherical caps are formed by spherical particles which protrude from the surface of the overcoat layer. The spherical caps in the modes of the multimodal size distribution have a prescribed ratio of sizes and area coverage to disperse specular light more uniformly over the hemisphere normal to the surface of the coating. Generally, low specular reflectance is desirable over all wavelength ranges where the object being concealed is exposed to diffuse light source and for specular light sources that are juxtaposed to the detector from which the object is to be concealed. In some embodiments, low specular coatings can be provided over the top of coatings containing the scattering porous particles of the present invention to control the specular reflectance characteristics of the surface together with the absorption and scattering characteristics of the surface.

Fabrication of Impermeable Porous Particles

Figure 3:
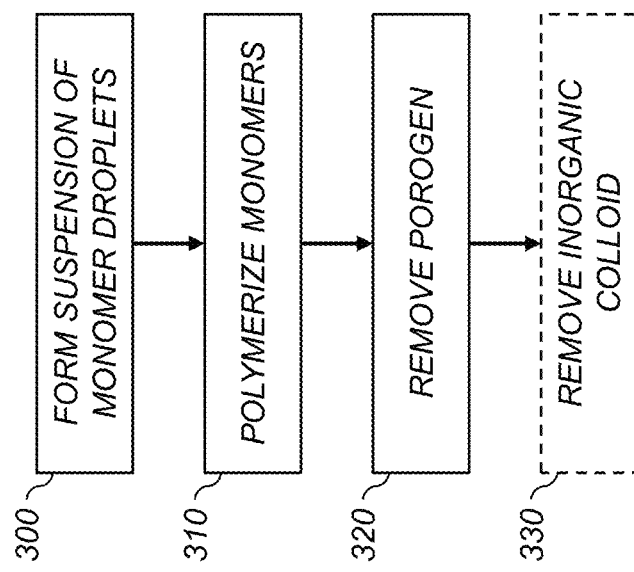

FIG. 3 shows a flowchart for a method of fabricating impermeable porous particles in accordance with an exemplary embodiment. The impermeable porous particles are core/shell particles having a porous polymer core and a polymeric shell where the particle comprises a polymer that is insoluble in solvents or water owing to the very high molecular weight of the polymer and cross-linking.

In a form suspension of monomer droplets step 300, a suspension of monomer droplets is formed in an aqueous medium. In a preferred embodiment, the monomer droplets are ethylenically unsaturated monomer droplets containing one or more monomers and a porogen, wherein at least one of the monomers is a cross-linking monomer. A majority of the monomers in the monomer droplets preferably have a log Po/w below 2.0, and more preferably below 1.5.

The porogen functions to create internal porosity in the particles once it is removed. The porogen comprises one or more solvents for the monomer and acts as diluent for the monomer to define the porosity once the monomer has been polymerized. The porogen must be at most only partially miscible in water and not be a strong solvent for the polymer. In an exemplary embodiment, the porogen includes two or more solvents, wherein one of the solvents has a greater miscibility in water than the other solvents. For example, the porogen can include cyclohexane and ethyl acetate, where ethyl acetate has a greater miscibility in water than cyclohexane. Ethyl acetate has a solubility of 8.3% in water at 20° C. and a log Po/w of 0.71 while the solubility of cyclohexane in water is about 0.005% with an estimated Po/w of 3.4. The partial miscibility of ethyl acetate enhances the solubility of monomers in the water phase and aid in the formation of a polymer shell at the oil water interface during polymerization. However, the solubility of low molecular weight molecules of polymer in ethyl acetate creates micro pores in the polymer shell for porogens with high levels of ethyl acetate and requires matrix polymers that seal the shell against penetration by water. Coatings using porous particles made using MM and hexane diol diacrylate (Hdda) using a porogen of 20% ethyl acetate and 80% cyclohexane were penetrated by water in fifteen minutes when coated using a low $T_g$ matrix polymer but not penetrated for 2.5 hours when coated using a high $T_g$ matrix polymer. On the other hand, porous particles made with MM and Tmpta using a porogen of 5% ethyl acetate and 95% cyclohexane were not penetrated by water in 8 hours when the same low $T_g$ matrix polymer is used.

The porogen must be miscible with the monomers before polymerization to ensure uniform distribution throughout the suspension droplets allowing a uniform distribution of monomer at the droplet-water interface to produce a consistent shell thickness. The pore morphology may be controlled by the solubility of the resulting polymer in the porogen. As the molecular weight of the polymer builds past the solubility limit in the porogen during the polymerization, the polymer precipitates into a solid phase leaving behind meso and macro pores filled with porogen, monomer, oligomers, and lower molecular weight polymer. As the monomers are depleted, polymerization rate slows with less precipitation occurring and the remaining monomer, oligomers, and lower molecular weight polymer add to the precipitated polymer to build and connect a network of polymer nodules to the shell leaving an open network of internal pores. The structure of this polymer network and resulting pores may be varied by changing the molecular weight at which polymer precipitates. For example, the morphology of poly methyl methacrylate (PMMA) can be controlled by the ratio of cyclohexane and ethyl acetate in the porogen. Cyclohexane is a poor solvent for PMMA while ethyl acetate is a good solvent for PMMA up to molecular weights of 250,000. Porogens high in cyclohexane will produce very large heterogenous pore structures while porogens with significant ethyl acetate will produce small uniform pore structures. When the porogen is a strong solvent for the polymer being made, the uniformity will be maintained throughout the droplet to the completion of polymerization and only micro pores too small to scatter light are formed.

In an exemplary embodiment, the aqueous medium contains a first stabilizer (also known as the particulate dispersing agent) and a polymerization initiator, wherein the first stabilizer is an inorganic colloid. The first stabilizer may also be an organic colloid as described in commonly-assigned U.S. Pat. No. 4,965,131 to Nair et al., which is incorporated herein by reference. The aqueous medium optionally contains a second stabilizer to provide a colloidally stabilized suspension. In an exemplary embodiment, the second stabilizer is a poly(2-ethyl-2-oxazoline) homopolymer as described in commonly-assigned U.S. Pat. No. 9,683,064 to Rollinson et al.

In some embodiments, the suspension optionally includes a promoter species to assist in the adherence of the particulate stabilizer materials to the interface between the discontinuous organic monomer phase droplets and the continuous aqueous phase. Low molecular weight polymers are useful as promoters. For example, oligomeric condensation polymers of methyl aminoethanol and adipic acid (see commonly-assigned U.S. Pat. Nos. 4,833,060, 4,965,131, 6,726, 991 and 7,888,410) which drives the first stabilizer to the interface between the water layer and the polymer solvent droplets.

A polymerize monomers step 310 is used to polymerize the monomers in the suspension. In a preferred embodiment the polymerization of the monomers is initiated by an initiator that is activated by heating the suspension. The result of the polymerization monomers step 310 is the formation of core/shell particles having a core of a porous polymer and a polymeric shell. The porous polymer core includes pores having a distribution of pore sizes. The pore sizes can be controlled by the ratio of monomer to porogen and by the solubility of the resulting polymer in the porogen. The polymeric shell preferably has a shell thickness of at least 5 nm and does not contain any pores having a diameter of more than 2 nm. The shell forms from monomer molecules that have dissolved in the water phase that diffuse back to the droplet surface and are polymerized at the interface as monomer within the droplet is depleted by polymerization. Monomers that have some solubility are water are required with Log Po/w values below 2.0 and preferably below 1.5 for the majority monomer in the droplet are useful for creating polymer shells.

A remove porogen step 320 is used to remove the porogen from the core/shell particles. In an exemplary embodiment, this step is performed by nitrogen swept distillation above the boiling point of the solvents in the porogen. For impermeable shells, it was found that adding a water-soluble extraction solvent to the water phase accelerated the removal the porogen. In an exemplary process, isopropyl alcohol (IPA) is added as the extraction solvent. After polymerization is complete, 100% IPA is added at a ratio of 2 parts to 3 parts water phase and the suspension heated to 70° C. with stirring for 30 minutes while a nitrogen sweep is used to remove extracted solvents. The lost volume of water phase is replenished by adding same volume but using 50% IPA in water and the temperature increased to 80° C. for 30 minutes. Lost water phase volume is subsequently replenished with water as the suspension is stirred at 90° C. for 1 hour and 95° C. for 3.5 hours.

The porous polymer particles are recovered by filtration followed by rinsing multiple times with distilled water. The particles are kept as a wet filter cake to aid dispersion in coating fluids. For good shelf life, the last rinse may include a biocide.

An optional remove inorganic colloid step 330 can be used to remove the inorganic colloid stabilizer. The remove inorganic colloid step 330 may be performed on the suspension before filtering or rinsing. Alternately, the wet cake may be resuspended in water. In an exemplary embodiment, this step was performed by resuspending wet cake using equal weights of wet cake and water. To this one eighth part 25% potassium hydroxide was added the suspension stirred for 45 minutes. The suspension was filtered and the particles resuspended in 0.1 N potassium hydroxide for 30 minutes. The suspension was filtered and rinsed until a neutral pH effluent was obtained.

In accordance with embodiments of the present invention, the resulting core/shell particles are used to form a coating disposed on a surface having specified scattering and absorption characteristics that are useful for camouflage applications. This can be done by various methods including those described below in the Coating Formulations and Methods section. The coating fluid dispersion preferably includes a film-forming latex. When the coating fluid dries, the film-forming latex forms a film over the surface of the polymeric shell which causes the shell to be impermeable to a liquid. Within the context of the present invention, a shell is said to be impermeable if a liquid does not pass through the shell to substantially permeate the porous core within a time interval of 30 minutes. The porous core is said to be substantially permeated by a liquid when the amount of radiation in an appropriate wavelength band which is scattered by the particles is reduced by more than 50%.

Panchromatic Scattering Coatings

In some camouflage applications it is desirable for the surface of the article to be scattering across a wide range of wavelengths (e.g., in the ultraviolet, visible and near-infrared wavelength bands). For example, such coatings would be useful for aircraft which should look white against a cloud-covered sky. FIGS. 4A-4D illustrate several multispectral camouflage configurations which provide this characteristic.

FIG. 4A illustrates an article 100 having a coating 120 disposed over the surface 110 of a substrate 105 in accordance with an exemplary embodiment. The coating 120 includes a plurality of panchromatic scattering porous particles 125 dispersed in a binder 130. Each of the panchromatic scattering porous particles 125 include pores 140 having a variety of pore sizes. In particular, the pores 140 include: a first set of pores 142 having a first average pore size d1 in the range $0.3 \leq d1/\lambda 1 \leq 0.7$, wherein $\lambda 1$ is a wavelength in the range of 250-400 nm; a second set of pores 144 having a second average pore size d2 in the range $0.3 \leq d2/\lambda 2 \leq 0.7$, wherein $\lambda 2$ is a wavelength in the range of 400-700 nm; and a third set of pores 146 having a third average pore size d3 in the range $0.3 \leq d3/\lambda 3 \leq 0.7$, wherein $\lambda 3$ is a wavelength in the range of 700-3000 nm. The first set of pores 142 is adapted to scatter ultraviolet light, the second set of pores 144 is adapted to scatter visible light, and the third set of pores 146 is adapted to scatter infrared light.

FIG. 4B illustrates an article 100 having a coating disposed over the surface 110 of a substrate 105 in accordance with another exemplary embodiment. In this case, the coating 120 includes porous particles 125a, 125b, 125c each having a different pore size. Ultraviolet scattering porous polymer particles 125a are adapted to scatter ultraviolet light and have a first set of pores 142 with a first average pore size d1 in the range $0.3 \leq d1/\lambda 1 \leq 0.7$, wherein $\lambda 1$ is a wavelength in the range of 250-400 nm. Visible scattering porous particles 125b are adapted to scatter visible light and have a second set of pores 144 with a second average pore size d2 in the range $0.3 \leq d2/\lambda 2 \leq 0.7$, wherein $\lambda 2$ is a wavelength in the range of 400-700 nm. Near infrared scattering porous particles 125c are adapted to scatter near infrared light and have a third set of pores 146 with a third average pore size d3 in the range $0.3 \leq d3/\lambda 3 \leq 0.7$, wherein $\lambda 3$ is a wavelength in the range of 700-3000 nm.

FIG. 4C illustrates an article 100 having a coating disposed over the surface 110 of a substrate 105 in accordance with another exemplary embodiment. The coating 120 includes a plurality of polychromatic scattering porous particles 125 dispersed in a binder 130. Each of the panchromatic scattering porous particles 125 include pores 140 having a variety of pore sizes. In particular, the pores 140 include: a first set of pores 142 adapted to scatter visible light having a first average pore size d1 in the range $0.3 \leq d1/\lambda 1 \leq 0.7$, wherein $\lambda 1$ is a wavelength in the range of 250-400 nm; and a second set of pores 144 adapted to scatter visible light having a second average pore size d2 in the range $0.3 \leq d2/\lambda 2 \leq 0.7$, wherein $\lambda 2$ is a wavelength in the range of 400-700 nm. The polychromatic scattering porous particles 125 are adhered to each other and to the substrate 105 with a binder 130 which doesn't fill the voids between the polychromatic scattering porous particles 125. The unfilled voids between the polychromatic scattering porous particles 125 provide a third set of pores 146 adapted to scatter infrared light having a third average pore size d3 in the range $0.3 \leq d3/\lambda 3 \leq 0.7$, wherein $\lambda 3$ is a wavelength in the range of 700-3000 nm.

FIG. 4D illustrates an article 100 having a coating disposed over the surface 110 of a substrate 105 in accordance with another exemplary embodiment. This embodiment includes features from both FIG. 4B and FIG. 4C. In this case, the coating 120 includes porous particles 125a, 125b, each having a different pore size. Ultraviolet scattering porous polymer particles 125a are adapted to scatter ultraviolet light and have a first set of pores 142 with a first average pore size d1 in the range $0.3 \leq d1/\lambda 1 \leq 0.7$, wherein $\lambda 1$ is a wavelength in the range of 250-400 nm. Visible scattering porous particles 125b are adapted to scatter visible light and have a second set of pores 144 with a second average pore size d2 in the range $0.3 \leq d2/\lambda 2 \leq 0.7$, wherein $\lambda 2$ is a wavelength in the range of 400-700 nm. The porous particles 125a, 125b are adhered to each other and to the substrate 105 with a binder 130 which doesn't fill the voids between the porous particles 125a, 125b. The unfilled voids between the porous particles 125a, 125b provide a third set of pores 146 adapted to scatter infrared light having a third average pore size d3 in the range $0.3 \leq d3/\lambda 3 \leq 0.7$, wherein $\lambda 3$ is a wavelength in the range of 700-3000 nm.

Figure 5:
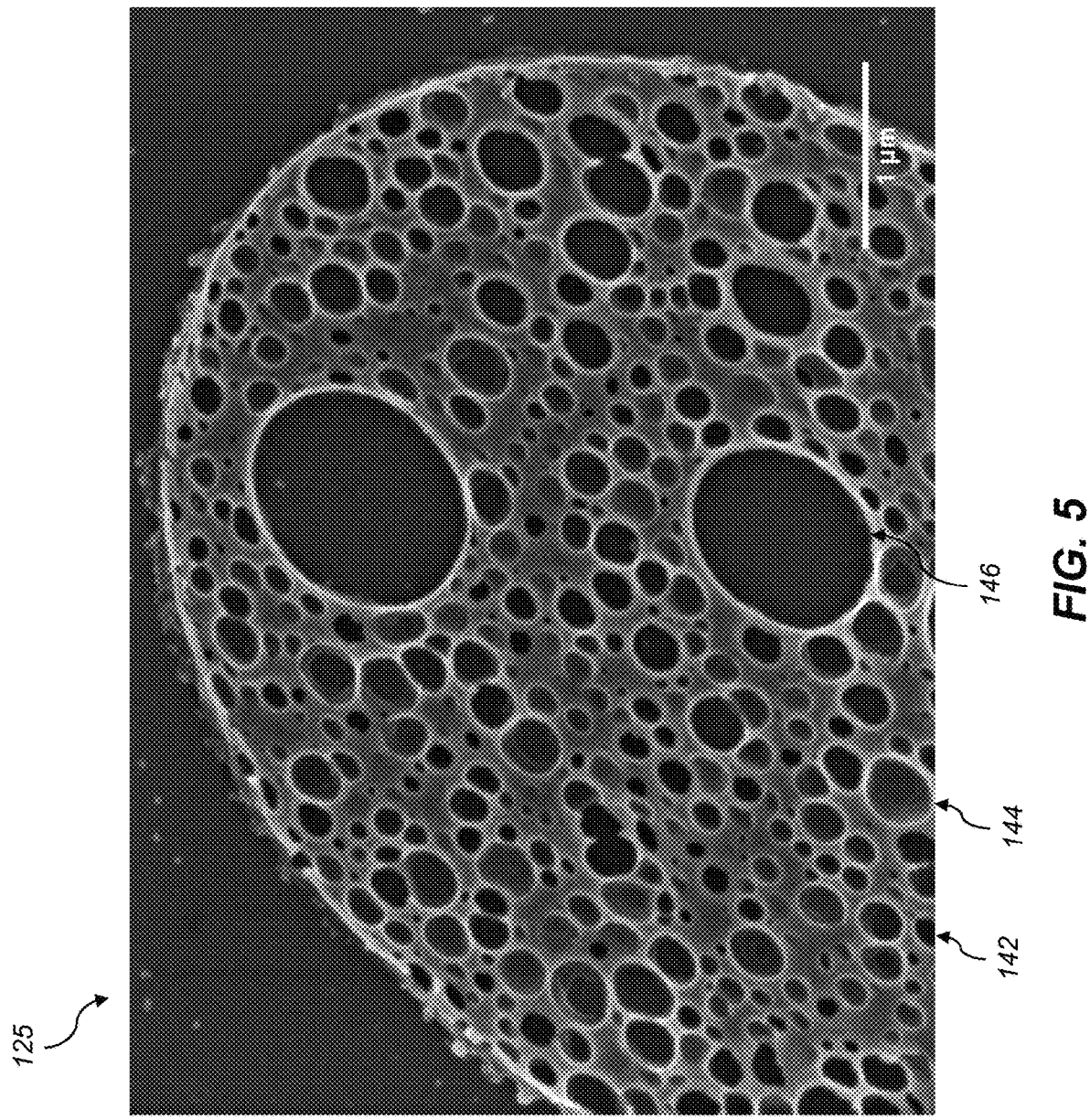

FIG. 5 shows a cryo-face-off SEM micrograph of an exemplary ELC WOW particle comprising cellulose acetate butyrate porous particle 125 having three different pore sizes corresponding to sets of pores 142, 144, 146. Note that the particle and pores in FIG. 5 are spherical and their cross sections have been compressed to ellipses by the microtome force in the cryo-face-off preparation method.

Colored Camouflage with Infrared Scattering Coatings

In some camouflage applications it is desirable for the surface of the article to be scattering in the infrared wavelength band to supplement colored light reflected from the surface having a color controlled by subtractive colorants. For example, many conventional camouflage fabrics are colored and patterned such that they match a typical background (e.g., foliage) with the visible wavelength band, but can be more easily detected within the infrared wavelength band. In an exemplary multispectral camouflage embodiment, a layer including porous particles can be used to control scattering in the infrared to more closely match the spectral characteristics of the background. FIGS. 6A-6D illustrate several multispectral camouflage configurations which provide this characteristic.

FIG. 6A illustrates an article 100 having a coating 120 disposed over the surface 110 of a substrate 105 in accordance with an exemplary embodiment. The coating 120 includes a plurality of porous particles 125 dispersed in a binder 130. Each of the porous particles 125 include pores 140 having a specified distribution of pore sizes. The pores 140 include a set of pores adapted to scatter infrared light having an average pore size d in the range $0.3 \leq d/\lambda 3 \leq 0.7$, wherein $\lambda 3$ is a wavelength in the range of 700-3000 nm. In some embodiments, the porous particles 125 can also include pores adapted to scatter light in other wavelength bands.

A subtractive colorant 132 is used to control a visible color of the article. In the example of FIG. 6A, the subtractive colorant 132 is dispersed in the binder 130. In other embodiments, the subtractive colorant 132 can be provided in other locations. For example, in the configuration of FIG. 6B, particles of colorant 132 can be disposed on the surface of the pores 140 within the particles 125. This can be accomplished by adding a dispersion of the subtractive colorant 132 to the porogen during the porous particle manufacturing. The subtractive colorant 132 may also be dispersed throughout the polymer of the porous particle by incorporating an oil dispersion of the subtractive colorant 132 to the oil phase of the porous particle manufacturing. Alternatively, the colorant can be distributed within an underlying layer 150 positioned between the coating 120 and the substrate 105 as illustrated in FIG. 6C, or in an overcoat layer 155 as illustrated in FIG. 6D.

Figure 7:
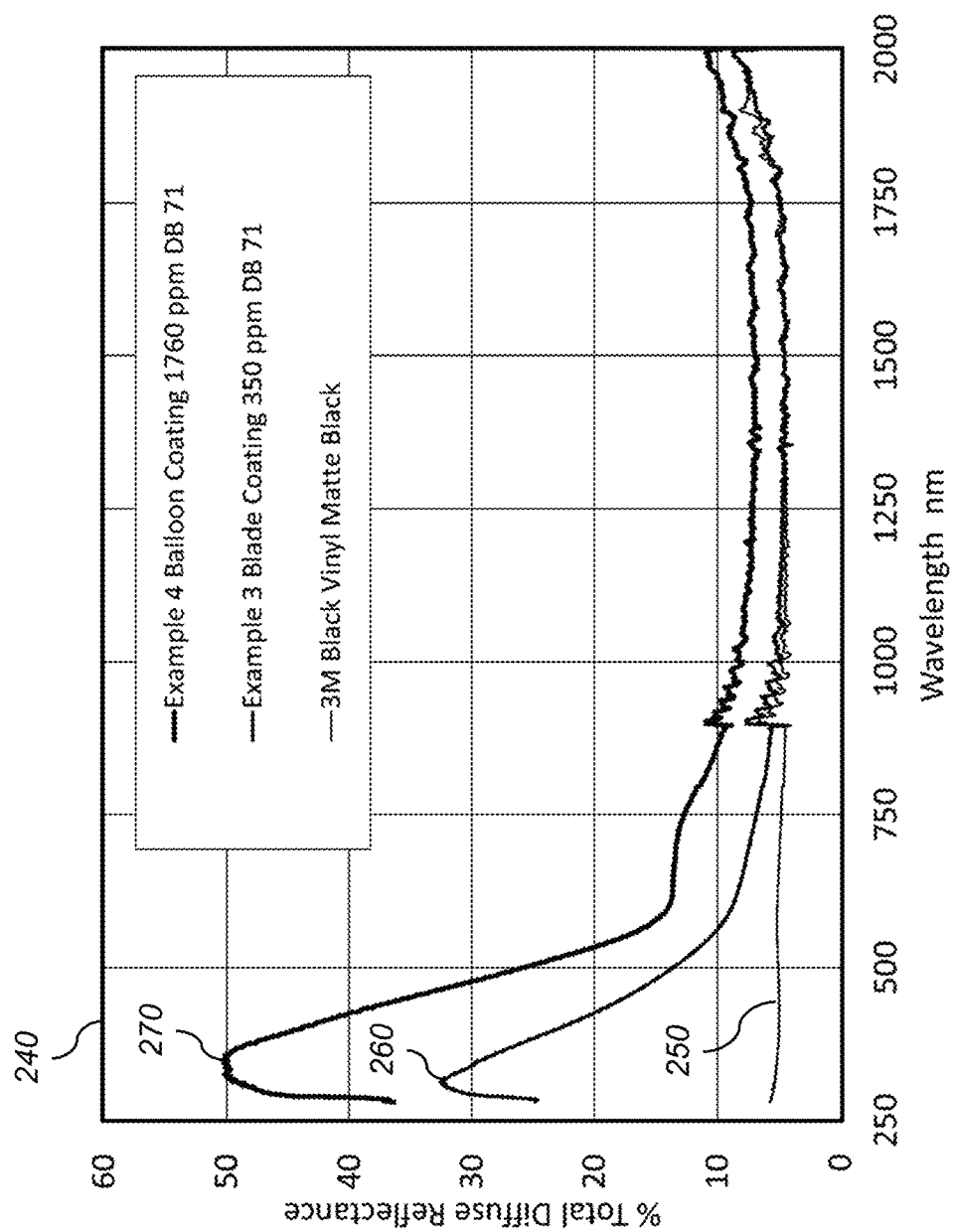

FIG. 7 shows a graph 240 including measured total diffuse reflectance spectra 250, 260, 270 for normal incidence light. Spectrum 250 corresponds to 3M™ Wrap Film Series 1080 matte black vinyl. Spectrum 260 corresponds to Inventive Example 3 blade coating on 3M™ Wrap Film Series 1080 matte black vinyl comprising a scattering layer with 350 ppm Direct Blue (DB) 71. Spectrum 270 corresponds to Inventive Example 4 spray coating on a balloon comprising a scattering layer with 1760 ppm DB 71. The level of DB 71 Spectrum 260 is nearly imperceptible at a wavelength 600 nm while that of Spectrum 270 is evident to maintain a strong blue color while achieving high UVA/B reflectance. The NIR/SWIR reflectance of Spectrum 270 is higher due to the use of porous particle in the absorbing underlayer.

Ultraviolet Scattering Coatings

In some camouflage applications it is desirable for the surface coating of the article to be scattering in the ultraviolet wavelength band, while being transparent in the visible and short-wave infrared bands. For example, when an aircraft is viewed from below against the sky, conventional surfaces can be detected by a lack of radiation in the ultraviolet portion of the spectrum. By covering the surface with a coating which scatters ultraviolet light, the surface of the airplane can appear to more closely match the appearance of the background sky (either cloudy or clear sky) which includes high level of ultraviolet radiation. If the coating is transparent in the visible and infrared wavelength bands, the spectral content in these bands can be controlled by the color of absorbing layers or the substrate. In some embodiments, the coating can also be designed to scatter some degree of blue light which can be used to simulate the appearance of blue sky. FIGS. 8A-8D illustrate several UV scattering camouflage configurations.

FIG. 8A illustrates an article 100 having a coating 120 disposed over the surface 110 of a substrate 105 in accordance with an exemplary embodiment. The coating 120 includes a plurality of porous particles 125a dispersed in a binder 130. Each of the porous particles 125a include pores 140 having a specified distribution of pore sizes. In an exemplary configuration, the pores 140 have a light scattering effective pore size of no more than 100 nm. This ensures that the pores will provide a high degree of scattering in the ultraviolet spectral band without scattering significantly in the longer wavelength visible and infrared spectral bands. Preferably, the coating has a scattering opacity of no more than 20% in the wavelength band from 500 to 3000 nm (which includes the green, yellow, orange, and red portions of the visible spectrum, as well as the NIR and SWIR portions of the infrared spectrum. In some embodiments, the porous particles 125a have an impermeable shell 135, which is impermeable to a liquid as has been discussed earlier.

In some embodiments, the low-specular reflectance surfaces disclosed in the aforementioned, commonly-assigned U.S. Patent Application Publications 2020/0199373, 2020/0199379 and 2020/0199381 to Lofftus can be combined with the ultraviolet scattering porous particles of FIG. 8A. In some arrangements, the low-specular reflectance surface can be provided over the top of the coating 120 as an overcoat layer 155 (FIG. 1).

In another arrangement, the porous particles themselves can be used to form the low-specular reflectance surface as illustrated in FIG. 8B. In this arrangement, the porous particles protrude from the coating 120 to provide substantially spherical caps having a multimodal size distribution. As described in more detail in the aforementioned U.S. Patent Applications by K. Lofftus, the multimodal size distribution has a distribution function having two or more modes, each mode having a peak defining an associated mode cap size, wherein the distribution function includes a first mode having a first peak corresponding to a first cap size and a second mode having a second peak corresponding to a second cap size. A mode width parameter for each of the modes is preferably less than or equal to 1.0, the mode width parameter for a particular mode being given by a ratio of a full-width half-maximum width of the particular mode to the cap size of the particular mode. In a preferred embodiment, a ratio of the second cap size to the first cap size is between 1.7-4.0, a smallest of the mode cap sizes is greater than or equal to 1.0 microns, and a largest of the mode cap sizes is greater than or equal to 3.0 microns. In the exemplary embodiment shown in FIG. 8B, the multimodal size distribution includes three modes corresponding to three particle sizes: a first particle size corresponding to porous particles 125d, a second particle size corresponding to porous particles 125e, and a third particle size corresponding to porous particles 125f. Each type of porous particles 125d, 125e, 125f have pores 140 having light scattering effective pore size of no more than 100 nm such that they scatter ultraviolet radiation as discussed earlier. The porous particles 125d, 125e, 125f are applied to the surface 110 of the substrate 105 using a binder 130 which is applied in an amount which leaves the upper surfaces of the porous particles 125d, 125e, 125f protruding from the coating to provide corresponding caps 160, 162, 164.

Figure 9:
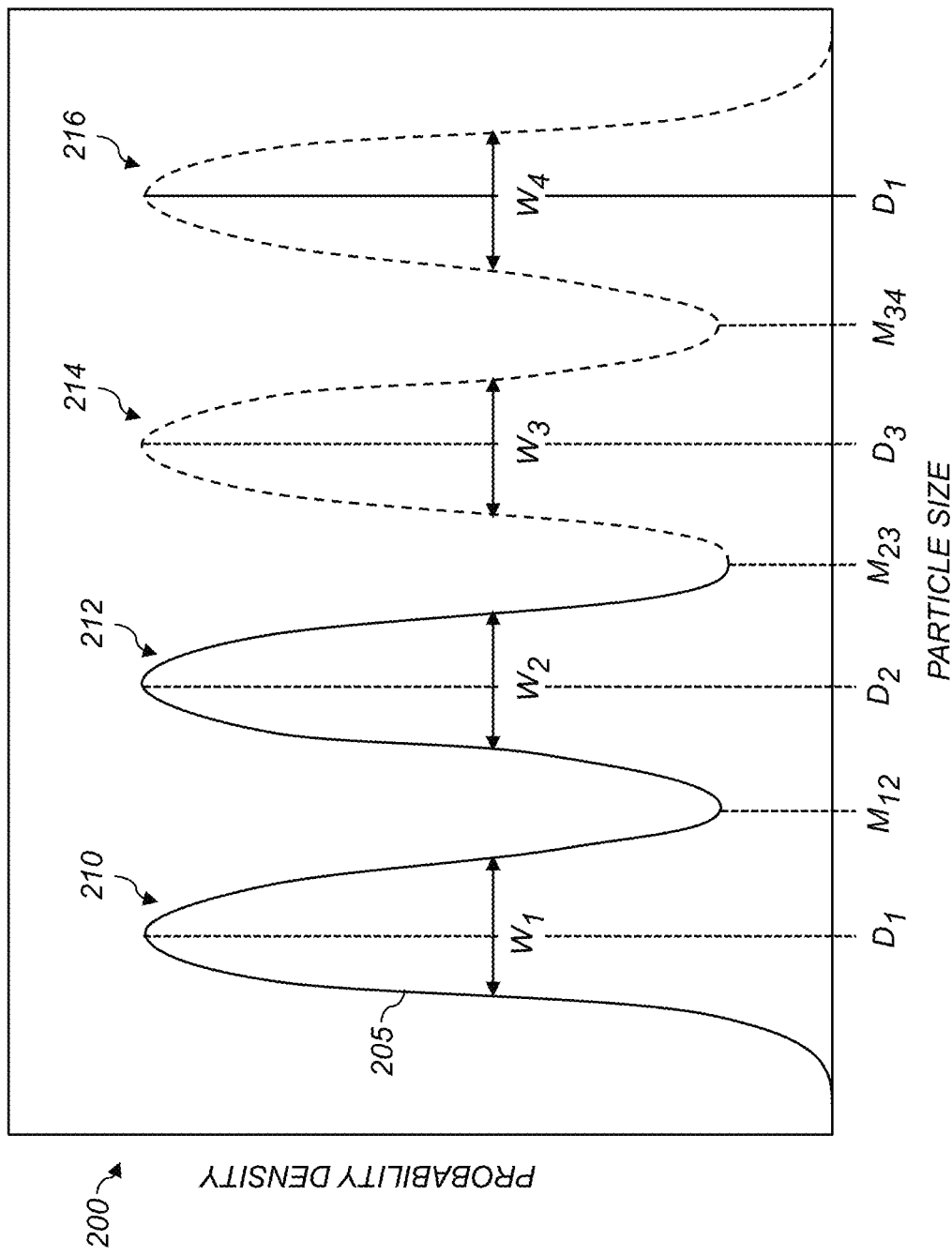

FIG. 9 illustrates an exemplary multimodal particle size distribution 200 useful to form the low-specular-reflectance coating 120 of FIG. 8B. The multimodal particle size distribution 200 is characterized by a distribution function 205 having two modes, and preferably three or four modes. The illustrated distribution function 205 includes a first mode 210 having a first peak corresponding to a first particle size $D_1$, and a second mode 212 having a second peak corresponding to a second particle size $D_2$. (As used herein, the first mode 210 refers to the mode having the smallest diameter and each subsequently numbered mode is the next largest mode in the distribution.) A ratio of the second particle size to the first particle size is preferably in the range $1.7 \leq D_2/D_1 \leq 4.0$. In an exemplary configuration, the ratio of the second particle size to the first particle size is about $D_2/D_1 \approx 2.0$. More preferably, the distribution function 205 further includes an optional third mode 214 having a third peak corresponding to a third particle size $D_3$, where a ratio of the third particle size to the second particle size is between $1.7 \leq D_3/D_2 \leq 4.0$. In some embodiments, the distribution function further includes a fourth mode 216 having a fourth peak corresponding to a fourth particle size $D_4$, where a ratio of the fourth particle size to the third particle size is between $1.7 \leq D_4/D_3 \leq 4.0$. Preferably, the largest particle size should be at least 4× the wavelength of the light being diffused based on the performance of measured samples. For visible light applications where the larges wavelength is about 750 nm, the largest particle size should preferably be at least 3.0 microns. The smallest particle size should preferably be larger than 0.7× the wavelength of the light being diffused based on Mie scattering theory, and more preferably should be larger than 1× the wavelength. In preferred embodiments, the smallest particle size is greater than or equal to 1 micron, and more preferably is greater than or equal to 2 microns. In the example of FIG. 8B, the multimodal particle size distribution 200 has three modes 210, 212, 214.

FIG. 8C illustrates another exemplary embodiment, which includes a coating 120 similar to that of FIG. 8A. In this case, underlying layer 150 is used to control scattering and absorption characteristics in other portions of the spectrum. The underlying layer 150 includes panchromatic scattering porous particles 125 similar to those shown in FIG. 4A. The underlying layer 150 can optionally include subtractive colorants as discussed earlier. The panchromatic scattering porous particles 125 in the underlying layer 150 can optionally be replaced by a mixture of porous particles 125a, 125b, 125c, each having a single pore size as was discussed relative to FIG. 4B. FIG. 8D illustrates another embodiment that combines the low-specular reflectance coating 120 of FIG. 8B with the underlying layer 150 of FIG. 8C.

Fabrication of Porous Particles

Porous Particle P1 (used in Inventive Examples 1A and 1B described below) was made using the WOW PLC method as taught in U.S. Pat. No. 8,703,834 using a monomer oil phase O comprising 90% methyl methacrylate (MM) monomer and 10% CN301, a polybutadiene dimethacrylate oligomer (Bdma) from Sartomer Americas (a part of Arkema Americas). To this, 1.9% Grindsted® PGPR 90 from Dupont de Nemours, Inc., was added as an emulsion stabilizer. The porogen first water phase W1 comprising 1.95% water solution Aqualon™ CMC-9M31F from Ashland was prepared and used in W1-to-O weight ratio of 2-to-3. The porogen water phase W1 was mixed into oil phase O and then emulsified at high energy to form a first emulsion W1/O. An initiator was incorporated at 0.8% of the monomer weight by adding a 25% solution of Vazo™ 52 from The Chemours Company FC, LLC in ethyl aetate to the first emulsion W1/O. A second water phase W2 was prepared using 5% solution Ludox® ™ from W. R. Grace and Company in a 207 mM pH 4 citrate buffer resulting in a W2 with 2.5% colloidal silica. The W1/O was mixed with W2 in an ice bath at a ratio of 3 parts W1/O to 5 parts W2. The mixture was then emulsified at a lower energy to create a stable double emulsion. The double emulsion was then added to equal parts water heated to 55° C. and held overnight to form poly MM co-Bdma (CN301). The resulting porous particles had a 6.8 micron number mode as measured by a Sysmex FPIA2000 with 23% porosity measured by Hg intrusion in the form of isolated spherical macro pores.

The Porous Particle P2 (used in Inventive Examples 1B and 1C described below) was prepared using the same method as for Porous Particle P1 except that a mill dispersion of carbon was added to W1 to provide 0.2 weight percent carbon based on the dry weight of the porous particle. The carbon was modified as described in U.S. Pat. No. 5,851,280, which is incorporated herein by reference, using a freshy prepared diazomium salt made by reacting 3 parts 10% 4-ethylaniline in water with 1 part concentrated hydrochloric acid below 12° C. for 30 minutes, adding 0.6% urea and stirring for 5 minutes then filtering. The diazonium salt solution was adding at 1 part to 10 parts 14% Regal 330 carbon black dispersion in water and stirred for 3 hours then filter, rinsed, and vacuum dried at 50 C overnight. The modified carbon was then milled to 100 nm volume mode carbon dispersion.

Porous Particle P3 (used in Inventive Example 1D described below) was prepared using the WOW ELC as described in U.S. Pat. No. 7,754,409 comprising Kao N, which is a polyester resin obtained from Kao Specialties Americas LLC, a part of Kao Corporation, Japan, dissolved in ethyl acetate, 0.2% Efka® 6225 from BASF as an emulsion stabilizer, and 1% carbon in the oil phase of the WOW. The porogen first water phase W1 comprising 1.95% water solution 250,000 Mw CMC from Acros Organics B.V.B.A. of New Jersey, part of Thermo Fisher Scientific, was prepared and used in W1-to-O weight ratio of 2-to-3 and emulsified. A second water phase W2 was prepared using 3.6% solution Nalco™ 1060, and 50 nm colloidal silica dispersion from Nalco Chemical Co. of Chicago, IL, in a pH 4 citrate/phosphate buffer resulting in a silica concentration of 1.8% colloidal silica dispersion. The W1/O was mixed with W2 at a ratio of 3 parts W1/O to 5 parts W2 emulsified to create a stable double emulsion, diluted 1:1 with water, then passed through a flash evaporator to remove the solvent in a continuous pilot process. Porous particle P3 had a number mode size of 4.9 microns was 31.6% porous.

Porous Particles P4 and P5 (used in Inventive Examples 2A and 2B described below) were made in a similar manner to Porous Particle P1 except that a solvent dye was dissolved in the monomer oil phase O. Porous Particle P4 contained 0.2% Orasol® Blue GL, a C. I. Solvent Blue 70 from Kremer Pigmente GmbH (now sold as Orasol Blue 855 by BASF). Porous Particle P5 contained 0.2% Valifast® Orange 3210, a mixture of solvent dyes from Orient Chemical Industries. Porous Particle P4 had 6.8 micron number modal size and 21.7% porosity while Porous Particle P5 had a 6.3 micron number modal size and 24% porosity.

Porous Particles P6, P7, and P8 (used in Inventive Examples 3 and 4 described below) were made using the DOW PLC method to produce 3 different sized particles having impermeable shells including cross-linked poly MM co-Hdda. An oil phase including equal parts MM and Hdda monomers were mixed in a ratio of 3-to-2 with a porogen phase comprising 4 parts cyclohexane to 1 part ethyl acetate. To this was added an initiator Vazo™ 52 from The Chemours Company FC, LLC at 0.85% by weight of monomer. This oil phase was added in a ratio of 3-to-5 to a water phase comprising water, a stabilizer (Ludox® ™ 20 nm colloidal silica from W. R. Grace and Company), a promoter (methyl aminoethanol adipate), and a second stabilizer (poly(2-ethyl-2-oxazoline) available as Aquazol® 50 by Polymer Chemistry Innovations, Inc.), with the level of the colloidal stabilizer and promoter varied to obtain different particle sizes. The mix was emulsified and reacted 45° C. overnight then finished by solvent extraction as described above. Porous Particles P6, P7, and P8 were made using 40% porogen comprising 20% ethyl acetate and 80% cyclohexane and were made at 3 particle sizes of 5.4, 12, and 30 micron mean surface weighted diameter, respectively, as measured by a Coulter Counter and a porosity of about 33% using the Coulter Counter and Aerosizer method. The pores comprised isolated meso pores of 15 to 50 nm and networked macro pores less than 200 nm in size with a Mie backward scattering effective size of 60 nm.

The Porous Particle P9 was made using the DOW PLC method described for Porous Particles P6 comprising MM at 50% and 50% Tmpta using 40% porogen comprising 5% ethyl acetate and 95% cyclohexane was made at a particle size of 4.8 micron number mode diameter as measured by a Coulter Counter and a porosity of about 35%. The pores comprised networked micro and pores of about 50 nm in size and macro pores from 100 to 1500 nm in size.

Porous Particle P10 comprising 50% MA and 50% Tmpta was made using the DOW PLC method described for Porous Particles P9 using 35% porogen comprising 5% ethyl acetate and 95% cyclohexane was made at a particle size of 18.1 micron number mode diameter as measured by a Coulter Counter and a porosity of about 43%. The resulting Porous Particle P10 had a 10 nm impermeable polymer shell surrounding interconnected macro pores about 100 to 2000 nm in size. ICP measurement of the porous particle found most of the colloidal silica present in the wet cake of the porous particle but was mostly lost during the cryo-face-off sectioning described Evaluation Methods below as seen in FIG. 2A.

Porous Particle P11 included as a comparative example was made with 40% styrene and 60% divinyl benzene using the DOW PLC method and a diluent comprised 25% cyclohexanol and 75% toluene. The log Po/w and solubility in water of styrene are 2.7 and 0.03% respectively while those of divinylbenzene at 3.8 and 0.005%. As expected, the particle had no polymer shell and an inorganic shell was not supported resulting in fragile particles with an open porosity. The particles were about 12 microns in size but could not be measured by typical techniques such as electrical sensing zone methods (e.g. Coulter Counter), sedimentation, sieving, and light scattering due to the open porous structure, fragility, and small size.

Table 1 shows a comparison of the Porous Particles P1-P11, summarizing the corresponding fabrication method and particle composition.

TABLE 1

Porous particles used in example coatings

| Particle | Method | Polymer | Porogen | $D_{n,mode}$ | Porosity | Pigments |
|---|---|---|---|---|---|---|
| P1 | WOW PLC | 90/10 MM/Bdma | 2:3 W:O | 6.8 | 23.0% | None |
| P2 | WOW PLC | 90/10 MM/Bdma | 2:3 W:O | 6.8 | 21.7% | 0.2% Carbon |
| P3 | WOW ELC | Kao N | 2:3 W:O | 4.9 | 31.6% | 1.0% Carbon |
| P4 | WOW PLC | 90/10 MM/Bdma | 2:3 W:O | 6.8 | 21.7% | 0 2% Orasol Blue GL |
| P5 | WOW PLC | 90/10 MM/Bdma | 2:3 W:O | 6.8 | 21.7% | 0.2% Valifast Orange 3210 |
| P6 | DOW PLC | 50/50 MM/Hdda | 2:3 D:O | 4.9 | 33.1% | None |
| P7 | DOW PLC | 50/50 MM/Hdda | 2:3 D:O | 11.4 | 35.1% | None |
| P8 | DOW PLC | 50/50 MM/Hdda | 2:3 D:O | 24.5 | 33.2% | None |
| P9 | DOW PLC | 50/50 MM/Tmpta | 2:3 D:O | 4.8 | 35% | None |
| P10 | DOW PLC | 50/50 MA/Tmpta | 1:2 D:O | 18.4 | 44% | None |
| P11 | DOW PLC | 40/60 Styrene co divinyl benzene | 3:2 D:O | N/A | N/A | None |

Coating Formulations and Methods

The various layer formulations used in the practice of this invention comprise an aqueous dispersion of the desired components. For example, the multispectral camouflage coating formulation typically include porous particles as an additive colorant, and optionally include a matrix polymer and subtractive colorants, all mixed together in water to form a stable aqueous dispersion. The multispectral camouflage coating formulations generally have a solids content of 30-40% while low specular reflectance overcoat formulations have a solids content of 15-25%.

In some embodiments, the matrix polymer can be chemically crosslinked. The coating formulations can optionally include relatively smaller amounts of other materials, such as crosslinking agents, tinting colorants, thickeners, and pH control agents.

For lower solids content, thickeners can be included to enhance the formulation viscosity if desired. Known thickeners can also be utilized to control the rheology of the multispectral camouflage coating formulation depending upon the method used to apply it to a substrate (or underlying layer). Particularly useful rheology modifiers are Rheovis® PU 1214 (BASF), Acrysol® G111 (Dow Chemical Company), and Carbopol® Aqua SF-1 (Lubrizol).

Agents capable of being crosslinked under appropriate conditions after coating may be added to provide improved insolubility of a particular layer in water and promote the adhesion to the substrate or optional underlying layers. The crosslinking agent is a chemical having functional groups that are activated chemically with heat, radiation, or other means that are capable of reacting with reactive sites on the latex polymer under curing conditions to thereby produce a crosslinked structure. Examples of suitable crosslinking agents include multi-functional aziridines, aldehydes, and epoxides.

Drying and optional crosslinking of the matrix polymer in the layer formulation can be accomplished by suitable means such as by heating, and various mechanisms can be employed for crosslinking the matrix polymer. For example, the crosslinking can involve condensation or addition reactions promoted by heat or radiation. In one embodiment, a latex composition is used as the matrix polymer. Upon heating, the latex film dries, with a crosslinking reaction taking place between the reactive side groups of the polymer chains. Such a latex is referred to as a thermoset emulsion. If the particular latex polymer used is not itself heat reactive, then suitable catalysts or crosslinking agents can be added to promote crosslinking upon heating.

One skilled in the art would understand that other coating vehicles and film forming can be used, including high vapor pressure organic solvents either alone or in combination with water to obtain the desired formulation quality.

The multispectral colorant and underlying layer formulations can be thusly prepared and coated or otherwise applied onto a substrate by any of a number of well-known techniques, such as wrapped wire rod coating, blade coating, spray coating, air knife coating, gravure coating, reverse roll coating, slot coating, extrusion hopper coating, slide coating, curtain coating, spray coating, foam coating, froth coating, rotary screen coating, pad coating, and other techniques that would be readily apparent to one skilled in the art.

After application of the multispectral camouflage coating formulation (and underlying layer formulation if used) to the substrate, each formulation is generally dried by simple evaporation of water (and any other solvents) from the applied formulation and from the pores of the porous particles, which drying can be accelerated by known techniques such as convection heating to provide an article of the present invention.

The resulting articles can have any desired overall average dry thickness, but in most embodiments, the overall average dry thickness is at least 15 µm or typically at least 100 µm. This overall average thickness includes any dry substrate thickness described above (including any subbing or adhesion layers) and any overcoat (including the low specular reflectance coatings described above) as well as an average dry thickness of the multispectral camouflage coating of at least 100 μm. All of these "average" dry thicknesses are estimated from the coating formulation and the wet coverage.

Evaluation Methods:

Freeze fracture samples were prepared by cooling the sample with liquid nitrogen and impacting with a sharp instrument such as a razor blade. Cryo-face-off sections were prepared by infusing wet samples with sucrose for more than one week, freezing in liquid nitrogen, sectioning in a microtome while frozen but surrounded by a liquid, and collecting the floating section on a transmission electron microscope (TEM) grid. Freeze fracture and cryo-face-off samples supported by the TEM grid were imaged using a Hitachi S-4100 SEM.

Total diffuse reflectance of normal illumination spectra was measured with Varian Cary 5E UV-VIS-NIR Spectrophotometer using and integrating sphere to collect the total diffuse reflectance.

Aerial imaging was performed with paired Nikon D5500 DSRL cameras with Nikon 105 mm F4.5 UV lenses where one of the cameras was customized by not having the RGB filter coating applied to the sensor and one having either a Hoya R72 lens filter for NIR capture or a Baader U-Filter UV Bandpass filter for UV capture while the other camera was used for VIS capture. A contrast was calculated as the minimum of the absolute difference between average reflected intensity for the target in each wavelength band and either the maximum or minimum reflected intensity in the frame excluding the target and reference at near range is used to express the detectability against the natural background at long range distance where the target may fill only a few pixels of the digital camera. The same contrast calculation using only the sky lit or shadowed portion of the target to express the identifiability of the target when imaged at a mid-range distance.

The specular reflectance viewed from a distance create glints that make an object detectable. Glare arises from off angle specular reflectance due to imperfections. Glint and glare were evaluated as the contrast added to the detectability. The ultimate added contrast at close-range varied with wavelength and was not always definable due to the saturation of the camera sensors for a given color, specular reflectivity, and camera exposure setting. The glint of a coating may be represented as the number of pixels expressed as the diameter for spherical and cylindrical targets where the contrast for a single pixel imaging the glint is increased by 0.5 taking into account the magnification effects of curved surfaces the image of the sun and the included angle at the target surface between the target and camera. This size in pixels was relatively invariant with wavelength and can be used to estimate the distance that a target may be detected given the imaging system MTF and magnification. For the low specular reflectance coatings, it was found that the ultimate added contrast was much lower than 0.50 and the pixels size to achieve this added contrast does not exist.

Coating toughness was evaluated by a micro-scratch test load at which coating damage other than compression occurred using Microscratch Tester developed and produced by CSM Instruments, Switzerland. All samples were conditioned for at least 24 hours at 70F/50% RH prior to testing. After this conditioning period, 3 ramped load scratches were generated in the (3.06-550 g) load range on each sample using a 75 micron radius, 90 degree conical diamond stylus as the abrader. A scratch velocity of 5 mm/min, a scratch length of 5 mm, and a loading rate of 546.94 g/min were used in all cases. An attached optical microscope was used to observe scratch track morphologies and determine the load required to initiate damage to the surface of each sample. All samples tested were backed by vinyl designed to be compliant and conform to shaped surfaces when applied to the target surface and therefore had plastic deformation due to compression at the lowest loads of 3 g.

Evaluation of coating impermeability were conducted by placing a drop of water on the coating and observing the loss of light scattering leading to a darker color due to the increased transmittance to the black substrate. Onset times were recorded when the drop was be spread and there was a just noticeable difference between the initial and newly wetted areas in diffuse light. Completion was recorded as the time when there was no further loss of light scattering. Water in the drop lost to evaporation was replenished periodically for longer observation times.

Comparative Example 1: Leaves

The total diffuse reflectance values of a single leaf over black for the front and back for maple, oak, and plum leaves are given in Table 2. NIR reflectance values approach 80% or higher for multiple leaves due to the lack of absorption in the NIR. SWIR reflectance values are lower than NIR due to absorption by water and hydroxides in the SWIR and multiple leaves may not achieve as high of a total reflectance as that seen in NIR. Low UV reflectance values are due to the strong absorption of UV by chlorophyll in the leaves.

TABLE 2

Measured Leaf characteristics.

| | % Reflectance in Ambient Light | | | | | % Illuminated Reflectance | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| Maple Front | 5.4 | 5.1 | 5.5 | 41.7 | 32.9 | 42.7 | 43.6 | 45.0 |
| Maple Back | 5.1 | 4.9 | 8.3 | 36.4 | 29.3 | 36.8 | 37.5 | 39.0 |
| Oak Front | 4.4 | 4.1 | 5.1 | 44.8 | 34.8 | 45.6 | 46.6 | 47.3 |
| Oak back | 5.7 | 5.2 | 11.6 | 43.5 | 35.3 | 44.2 | 44.2 | 45.1 |
| Plum Front | 5.0 | 4.8 | 6.4 | 49.1 | 39.4 | 48.9 | 51.7 | 51.0 |
| Plum Back | 4.7 | 5.0 | 9.0 | 47.5 | 39.4 | 47.1 | 48.9 | 49.4 |

Comparative Example 2: Woodland Pattern Camouflage Fabric

The Woodland Pattern camouflage fabric is a commercially available fabric developed in 1948 by ERL and put into use in Viet Nam then regularly in 1980's. The Woodland Pattern has some NIR contrast between black and other colors but no high NIR reflectance color to emulate green foliage. The green NIR reflectance is lower than the tan and brown risking exposure of camouflaged object or operator by hyperspectral analysis. Measurements for the colors used in the Woodland Pattern are shown in Table 3.

TABLE 3

Measured Woodland Pattern camouflage fabric characteristics.

| | Reflectance in Ambient Light % | | | | | Illuminated Reflectance % | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| Woodland Tan | 12.8 | 14.2 | 19.0 | 31.8 | 34.0 | 29.9 | 32.5 | 33.6 |
| Woodland Brown | 12.0 | 13.3 | 17.9 | 29.5 | 31.7 | 27.7 | 29.9 | 31.1 |
| Woodland Green | 8.6 | 9.6 | 13.9 | 22.4 | 24.8 | 21.8 | 22.0 | 23.5 |
| Woodland Black | 7.4 | 7.9 | 9.8 | 16.4 | 19.5 | 15.1 | 16.5 | 18.0 |

Comparative Example 3: Marine Pattern Woodland Camouflage Fabric

The Marine Pattern (MARPAT) Woodland camouflage fabric as described in U.S. Pat. No. 6,805,957 contains four colors (brown, green, khaki and black). Total diffuse reflectance measurements for three of the colors are shown in Table 4. The black color was not present in large enough areas to measure on the sample. Black is carbon base and provides high contrast. There is no mid-level NIR reflectance resulting in a stark black and with NIR image with mostly high NIR reflectance.

TABLE 4

Measured Marine Pattern Woodland camouflage fabric characteristics.

| | Reflectance in Ambient Light % | | | | | Illuminated Reflectance % | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| MARPAT Brown | N/A | N/A | 12.4 | 52.4 | 57.7 | 36.7 | 59.6 | 61.9 |
| MARPAT Green | N/A | N/A | 8.3 | 49.8 | 58.4 | 27.6 | 59.6 | 61.9 |
| MARPAT Khaki | N/A | N/A | 15.8 | 56.0 | 59.4 | 41.9 | 62.9 | 63.8 |

Comparative Example 4: MultiCam Camouflage Fabric

The MultiCam camouflage fabric, based upon U.S. Pat. No. 9,062,938, is made using skewed and oscillating print rollers for a second color printed over other colors providing a wide range of colors. Total diffuse reflectance measurements for some selected areas are shown in Table 5. There was no low NIR reflectance color in the sample. The darkest color was perceived as a brown and did not contain carbon. Green had lower NIR reflectance in the very near infrared (vNIR). Overall, there is a good range of contrast for total light amplification night vision devices, but there is a risk of exposure when using NIR only night vision devices or hyperspectral analysis.

TABLE 5

Measured MultiCam camouflage fabric characteristics.

| | Reflectance in Ambient Light % | | | | | Illuminated Reflectance % | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| Brown | 3.9 | 4.8 | 9.1 | 36.8 | 54.0 | 23.7 | 47.4 | 51.8 |
| Light Brown | 3.7 | 4.3 | 14.1 | 53.2 | 59.4 | 46.2 | 59.4 | 61.1 |
| Tan w/Green | 7.0 | 9.6 | 28.2 | 54.8 | 58.5 | 50.3 | 58.4 | 59.7 |
| Green | 3.9 | 4.8 | 13.5 | 31.9 | 54.2 | 24.8 | 35.4 | 40.7 |
| Light Green | 4.1 | 5.0 | 18.5 | 37.5 | 59.0 | 29.9 | 39.7 | 46.9 |
| Gray Green | 5.3 | 7.1 | 22.1 | 42.0 | 56.5 | 34.9 | 45.8 | 49.9 |
| Silver Gray | 12.1 | 17.7 | 40.9 | 59.9 | 59.9 | 56.9 | 62.9 | 62.6 |

Comparative Example 5: Rust-Oleum Paints

The matte paints in typical camouflage colors are provided by Rust-oleum company. The total diffuse reflectance values are given in Table 6 for a selection of these paints spray coated on different colored substrates. There is relatively small range of reflectance in the IR and little reflectance in UV. These matte paints were found to have 4 to 10 times the specular reflectance for light incident at 85 degrees from the normal compared to the low specular reflectance coatings described in commonly-assigned U.S. Patent Application Publications 2020/0199373, 2020/0199379 and 2020/0199381 to Lofftus.

The NIR/SWIR reflectance for khaki is reasonable for desert terrain but thick coatings are required to hide the substrate especially in SWIR where the opacity is low for Khaki. All the green paints had NIR/SWIR reflectance values less than khaki while natural greens of vegetation have reflectance values greater than 70 percent. While some contrast may be achieved between khaki and the different green paints, the overall reflectance in NIR/SWIR is too low increasing the detectability of the target. Hyperspectral analysis would reveal that the green VIS does not match the high reflectance in NIR/SWIR expected from vegetation further enabling detection.

The low and constant reflectance in UVA/UVB of the green paints is consistent with strong absorption of UV by chlorophyll in green plants. However, specular reflectance of UV from small surfaces such as grass blades and leaves increase the UV contrast in a natural scene. Higher UV reflectance values are seen for dry grass, bark, sand, and stone that khaki paint fails to provide.

TABLE 6

Measured Rust-oleum paint characteristics.

| | % Reflectance in Ambient Light | | | | | % Illuminated Reflectance | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| 279176 Army Green | 6.2 | 6.6 | 18.2 | 17.9 | 14.1 | 18.3 | 17.9 | 17.6 |
| 279177 Khaki on A1 | 6.8 | 7.4 | 25.2 | 26.9 | 22.8 | 28.3 | 25.9 | 25.5 |
| Khaki on black | 7.5 | 8.0 | 24.0 | 23.4 | 15.6 | 25.2 | 22.2 | 21.8 |

TABLE 6-continued

Measured Rust-oleum paint characteristics.

| | % Reflectance in Ambient Light | | | | | % Illuminated Reflectance | | |
|---|---|---|---|---|---|---|---|---|
| | UVB 280-315 nm | UVA 320-380 nm | VIS 400-700 nm | NIR 720-1000 nm | SWIR 1000-1800 nm | IR LED 760 nm | IR LED 880 nm | IR LED 920 nm |
| Khaki on white | 7.5 | 8.0 | 24.6 | 27.9 | 30.1 | 28.6 | 27.1 | 27.9 |
| Lt Green on black | 6.5 | 6.8 | 22.2 | 23.2 | 17.7 | 23.5 | 23.5 | 23.0 |
| Lt Green on white | 6.5 | 6.8 | 22.0 | 23.0 | 18.3 | 23.3 | 23.2 | 23.1 |
| 279176 Deep Forest Green on black | 5.6 | 5.6 | 9.8 | 8.8 | 7.0 | 9.2 | 8.4 | 8.5 |
| 279176 Deep Forest Green on white | 5.6 | 5.6 | 9.7 | 8.8 | 7.0 | 9.1 | 8.5 | 8.5 |

Comparative Example 6: Mylar Balloon

An inflated Orbz spherical party balloon consisting of a spherical metalized PET (Mylar) with white and black coating in the pattern of a soccer ball was imaging in conjunction with the inventive examples as a reference. The white area of this comparative example consisted of an additive colorant that was subtractive in UVA/B but thin enough to allow moderate UVA/B reflection from the metal coating. The combined scattering and absorbance in the UV by the white colorant reduced the UV specular reflectance from the metal coating without significantly reducing the VIS specular reflectance. The black areas of this comparative example consisted of a subtractive colorant for all the imaged wavelength bands (UVA/VIS/NIR). The ultimate added specular reflectance of glint and glare for the black was about 0.90, 0.89, 0.87, and 0.62 for red, green blue and UV respectively at an included angle between the sun, target surface, and observer of 90 degrees. No image allowing analysis of glint and glare on the black reference was captured in IR. The number of pixels for an added contrast of 0.50 was 14.3 pixels and 10.7 pixels for spheres and cylinders respectively.

Glint on black reference saturates an area of the array camera at low exposure that is about twice the diameter the image of the sun. Glare on black reference at low exposure increases reflected intensity in a continuous manner from the black with no glare at 0.1 reflected intensity for black to 1 at the glint. The glare adds 0.5 to the detection signal for a target having the specular properties of the reference when the target is cylindrical and 11 pixels in diameter or for a spherical that is 14 pixels in diameter. The detectability of a target is not strongly influenced by the glint and glare when the target fits completely within a single pixel of the imaging system. The effect of glint and glare on detection becomes significant at closer positions where the target fills more than 10 pixels.

Glint and glare on the white reference saturates camera even at low exposure settings with the saturated area being much greater than the image of the sun in VIS and NIR. Due to the absorbance of UV by the white pigment in the white reference, the UV glint increased the reflected intensity by 0.3 and the glare by 0.15 above that of the diffuse UV reflectance from the white reference.

Inventive Example 1: Nighttime Multi-Spectral Camouflage Fabric

It is desirable for nighttime camouflage to be black in VIS with absent of visible light sources but have contrasting reflectance in NIR to provide detection against NIR security light sources. The combination of process black using colorants that are non-absorbing in the NIR (for example a combination of yellow, cyan, orange, and magenta pigments to give a VIS black) with porous polymer particles having macro pores in the micron size range provide a visible black with high reflectance in the NIR and SWIR. High contrast in NIR is obtained while maintaining VIS black by varying the amount of carbon black in the coating. Inventive Example 1A-1D represent four coatings on a white cotton cloth where the coatings contain the same level of VIS colorant that are non-absorbing in NIR while varying the level of the broadly absorbing carbon.

Four fluids of different compositions suitable for screen printing were printed in adjacent areas of the white cotton cloth Sew Classic BTTMWGHT white Wrinklease 7 oz. per yard fabric by rolling viscous coating fluid through multiple filament nylon thread woven into mesh where the threads were spaced at 360 μm resulting in 200 μm openings for a 31% open area. These fluids were designed to give a consistent black in VIS while having a high variation in NIR reflectance. Three Porous Particles P1, P2, and P3 were prepared for use in the four fluids with Porous Particle P1 used in Inventive Example 1A, equal parts Porous Particles P1 and P2 used in Inventive Example 1B, Porous Particle P2 used in Inventive Example 1C, and Porous Particle P3 used in Inventive Example 1D.

The four coating fluids were prepared by combining the particles at a volume ratio of 2-to-1 matrix polymer with an acrylic latex Neocryl A-6093 from DSM, adding a viscosity modifier Rheovis PU1214 NC from BASF, and adding a combination of milled pigment water dispersions of PY 155, PO 35, PR 185, and BP 15:3. All of the fluids were prepared at 38-40 volume % solids plus pores contained within the porous particles. Inventive Example 1A corresponds to the configuration in FIG. 6A where the subtractive colorant is distributed within the binder, while Inventive Examples 1B, 1C, and 1D are a combination of the configurations of FIG. 6A and FIG. 6B so that the subtractive colorant is distributed both within the binder and inside of the pores.

The coating fluids were screen printed on the fabric using a PET stencil to create a different patterned image for each fluid. The coating was dried between each coating each fluid and the final coated cloth with the camouflage pattern cured at 125° C. for 20 minutes. These coated fabrics demonstrate the use of porous particles with pore sizes that scatter VIS and IR wavelengths, visible colorants, and a broadly absorbing neutral colorant to achieve a high variation of NIR reflectance while maintaining a consistent VIS black enabling black camouflage with a good match in NIR for natural backgrounds including vegetation, soils, rocks, and shadows. The NIR reflectance for Inventive Example 1A was greater than the cloth and near to that observed for multiple leaves while having a low reflectance in VIS.

Table 7A summarizes the formulations for Inventive Examples 1A-1D, and Table 7B summarizes the corresponding measured reflectance characteristics.

TABLE 7A

Formulations for Inventive Examples 1A-1D.

| Example | Additive Colorant Particle | % | % Subtractive Colorant Carbon | PY 155 | PO 38 | PR 122 | PB 15:3 |
|---|---|---|---|---|---|---|---|
| 1A | P1 | 59 | 0.00 | 0.54 | 1.45 | 0.43 | 1.06 |
| 1B | P1 & P2 | 59 | 0.06 | 0.55 | 1.50 | 0.43 | 1.06 |
| 1C | P2 | 59 | 0.12 | 0.57 | 1.55 | 0.43 | 1.06 |
| 1D | P3 | 54 | 0.54 | 0.58 | 1.81 | 0.48 | 1.12 |

TABLE 7B

Measured reflectance characteristics for Inventive Examples 1A-1D.

| | % Reflectance in Ambient Light | | | % Illuminated Reflectance | | |
|---|---|---|---|---|---|---|
| Example | VIS 400-700 nm | NIR 720-1000 nm | SWIR 1000-1800 nm | IR LED 760 nm | IR LED 880 nm | IR LED 920 nm |
| Cloth | 65.9 | 67.2 | 60.9 | 67.0 | 67.6 | 67.1 |
| 1A | 8.6 | 63.5 | 70.2 | 30.0 | 76.6 | 75.7 |
| 1B | 8.3 | 44.9 | 53.3 | 25.7 | 52.5 | 52.7 |
| 1C | 7.3 | 25.0 | 32.1 | 18.3 | 27.7 | 28.7 |
| 1D | 10.2 | 15.7 | 17.1 | 15.5 | 15.7 | 16.8 |

Inventive Example 2: Daytime Multi-Spectral Camouflage Fabric

At times it is not possible to achieve the desired VIS color with a broadly absorbing neutral colorant such as carbon. Inventive Example 2A, corresponding to FIG. 6A, demonstrates the using of porous particles and VIS colorants without the use of a broadly absorbing colorant to achieve a dark green that is highly reflective in NIR and SWIR and emulate leaves. Inventive Example 2B, corresponding to a combination of FIG. 6A and FIG. 6B, demonstrates the use of porous particles with pore sizes that scatter VIS and IR wavelengths to mask metallic luster and glints from colored metallic pigment is moderately absorbing in NIR and SWIR to achieve tans with a mid-level reflectance in NIR and SWIR to emulate soils, sand, and rock commonly found in desert environments. These samples were fabricated using a method similar to that described above for Inventive Example 1.

Table 8A summarizes the formulations for Inventive Examples 2A-2B, and Table 8B summarizes the corresponding measured reflectance characteristics.

TABLE 8A

Formulations for Inventive Examples 1A-2B.

| | Additive | | % Subtractive Colorant | | | | | | |
|---|---|---|---|---|---|---|---|---|---|
| | Colorant Part. | % | Carbon | SB 70 | SO Mix | Brass | PY 155 | PO 38 | PR 185 | PB 15:3 |
| 2A | P4 | 43 | 0.00 | 0.09 | 0.00 | 0.00 | 0.54 | 0.06 | 0.00 | 0.08 |
| 2B | P2/P5 | 52 | 0.03 | 0.00 | 0.08 | 1.17 | 0.18 | 0.00 | 0.33 | 0.02 |

TABLE 8B

Measured reflectance characteristics for Inventive Examples 2A-2B.

| | % Reflectance in Ambient Light | | | % Illuminated Reflectance | | |
|---|---|---|---|---|---|---|
| Example | VIS 400-700 nm | NIR 720-1000 nm | SWIR 1000-1800 nm | IR LED 760 nm | IR LED 880 nm | IR LED 920 nm |
| Cloth | 70.3 | 71.1 | 64.4 | 71.1 | 71.3 | 71.1 |
| 2A | 14.7 | 29.9 | 33.0 | 28.9 | 30.4 | 31.6 |
| 2B | 9.6 | 61.0 | 63.8 | 35.7 | 72.2 | 72.2 |

Aerial Camouflage Coatings

Lighting conditions must be considered when designing colorants for multispectral camouflage. The relevant light source during the daytime is sunlight after atmospheric absorption and scattering. Atmospheric scattering of the solar spectrum absent clouds and dust is greatest for the UV bands and least in the IR and SWIR bands. The scattering of longer wavelengths increases as atmospheric moisture droplets and dust increase in number and size.

The daylight illumination of a target is highly diffuse in UVA/B for nearly all directions above the target. The illumination at longer wavelengths may be specular for clear conditions or diffuse for cloudy conditions. The underside of airborne targets at very high altitudes will be illuminated by the scattered sunlight. For airborne targets close to the ground, the underside will be lit by sunlight reflection from the ground. Sandy and stony ground will reflect most wavelengths at a moderate level with the least being reflected for the UVA/B range. Green vegetation is highly reflective in the NIR and SWIR, slightly reflecting in the green range of VIS, and non-reflective in the UVA/B as well as the blue and red ranges of VIS. Snow scatters light like the atmosphere for cloudy conditions and is highly reflective in all wavelengths for UVB to NIR and strongly reflective in SWIR.

An effective camouflage design for airborne targets is to emulate atmospheric scattering against the blackness of space. The underlying layer should have a broad band subtractive colorant to emulate the blackness of space. Over this, an atmospheric scattering emulation layer comprising porous polymer particles with pores sizes to emulate various backgrounds against which the target is viewed such as clear or cloudy conditions. A final low spectral reflectance topcoat is applied to reduce or eliminate spectral reflections.

The atmospheric scattering emulation for clear conditions may contain a blue colorant to reduce the effect of long light paths through the coating at oblique incidence and viewing angles. A viewing angle that is oblique to the surface collects light over a larger portion of the surface and the coating will be more reflective than at a viewing angle normal to the surface. For example, the light scattered to an observer by the atmospheric emulation coating from the image edge of the circular fuselage emulates the atmospheric scattering at the horizon and appears too reflective when the aircraft is viewed against the darker blue of a clear sky at high elevation angles. A majority of light passing obliquely to the coating surface will pass through more of the coating and scattering from the layer increases the reflectance. This reflectance can be reduced by adding low levels of a subtractive colorant such as in Inventive Example 3 (350 ppm Direct Blue 71 coating as shown in FIG. 7). In this case, the amount of subtractive colorant has very little effect on the reflectance spectrum of normal incidence light. Higher levels of blue colorant can be used to sharpen the spectra and provide a greater UVA/B reflectance while maintaining a low reflectance in green, provided that the colorant has a low level of UV absorbance, such as in Inventive Example 4 (1760 ppm Direct Blue 71 coating as shown in FIG. 7).

An atmospheric scattering emulation layer that works for aerial targets in cloudy conditions such as those used in Inventive Example 5 also works well to emulate snow for ground-based targets. The reflectance of the underlying layer can be adjusted to better match the reflectance of the ground beneath the snow. These UVA/B reflective coatings may be interspersed with UVA/B absorbing and color regions to match non-snow cover objects in the natural scene.

Inventive Example 3: Aerial Blue-Sky Camouflage Coating

A first coating fluid for use as a scattering layer to emulate blue sky, corresponding to FIG. 6A, was made using the 5.4 micron particle P6 at 43 volume % solids plus pores and at volume ratio of 2 parts by volume particles to 3 parts matrix polymer, where the matrix polymer comprised 99% Hycar® 26120 (a thermoset acrylic emulsion from Lubrizol with a Tg of −11° C.) and 1% Carbopol® Aqua SF-1 (a viscosity modifier comprising a lightly cross-linked acrylate copolymer from Lubrizol). A solution of direct blue 71 was added to obtain a level of 353 ppm in the final dry coating. The Hycar® 26120 provided good flexibility to allow stretching and formability of the laminate when applied over curved surfaces.

A second coating fluid to act as a low specular reflectance overcoat, corresponding to FIG. 8B, was prepared using the 5.4, 12, and 30 micron Porous Particles P6, P7, and P8 in a ratio of 4-to-2-to-1 at 22 volume % solids and at a volume ratio of 3 parts by volume particles to 2 parts matrix polymer, where the matrix polymer comprised 12% Hycar® 26120, 83% Carboset® CR675 (a thermoplastic styrene-acrylic copolymer emulsion from Lubrizol having a minimum film forming temperature of 34° C. and a Tg of 70° C.) and 1% Carbopol® Aqua SF-1. The level of Hycar® 26120 Carboset® CR675 were chosen to balance scratch resistance and flexibility.

The first coating fluid was coated on corona discharge treated (CDT) 3M™ Wrap Film Series 1080 matte black vinyl using a 3 mil gap hand coating blade resulting in blue sky emulation layer of about 31 gsm and about 30 microns in thickness once dried. The same fluid was then coated in a continuous roll coating process using a slot die resulting in a dried coating of 37 gsm and a thickness of about 35 microns. The second fluid was coated by the same methods resulting in a low reflectance overcoat at 15 gsm that was also emulated blue sky with an average thickness of about 15 microns but with hemispherical features up to 25 microns above the first layer resulting in an coated article corresponding to FIG. 8D. The coatings were dried and cured to crosslink the Hycar® 2610. Total diffuse reflectance was measured on the samples of the blade and slot coated films. The measured reflectance values (shown in Table 9A) decrease monotonically with light wavelength providing no additional reflectance above that observed from the vinyl substrate in SWIR.

TABLE 9A

Measured reflectance characteristics for Inventive Example 3.

| | % Total Diffuse Reflectance of Normal Incident Light | | | | | | |
|---|---|---|---|---|---|---|---|
| Sample | UVB 280-315 nm | UVA 320-380 nm | VIS-B 400-500 nm | VIS-G 500-600 nm | VIS-R 600-700 nm | NIR 720-1000 nm | SWIR 1000-1800 nm |
| 3M Vinyl | 5.5 | 5.1 | 5.0 | 5.1 | 5.0 | 4.8 | 4.6 |
| Blade Coating | 29.8 | 28.9 | 17.8 | 10.8 | 8.0 | 6.3 | 4.7 |
| Slot Coating | 30.7 | 33.2 | 22.0 | 12.5 | 8.9 | 6.7 | 4.5 |

The two coating fluids were then diluted 5 parts fluid to 1 part water and spray coated on an inflated spherical 16 in black Orbz balloon that had been painted with Rust-oleum Universal 245197 satin black to achieve sufficient absorbance in the IR. The balloon was imaged in UV, VIS, and NIR spectral ranges against a blue sky about 50 to 75 feet above a green grass field in late spring.

Table 9B summarizes various detectability and identifiability metrics evaluated from the imaged balloons with the Inventive Example 3 coating, as compared to white and black reference samples (Comparative Example 6). As described above in the Evaluation Methods section, the ability to detect an target at a distance is the greatest value of either the difference between the average reflectance of the lit portion of the target minus the reflectance of the brightest region of the local background, the sky in this case, or the darkest region of the local background minus the average of the shadowed portion of the target. This metric applies at a distance where the area of any portion of the target is a few pixels in the imaging system and can be distinguished from the background. The number of pixels filled by the portion of the target needed to detect the target for an imaging system with a given MTF and magnification increases with a decreasing detectability and requires the target to be closer for it to be detected. Inventive Example 3 exhibits a significant reduction in the detectability of the target in UV, blue (B), and NIR spectral ranges while being virtually undetectable in the green (G) and red (R) ranges. The shadowed portion of the balloon experienced a lack of lighting in UV and a strong lighting in NIR from sun light reflected off the grass resulting in an increased detectability in those spectral ranges. At much higher elevations, most of the lighting of the shadowed portion of the target would be atmospheric light scattered from the horizon resulting in a better match to the lit portion of the target and a decreased detectability.

The ability to identify a target at a distance relies upon having enough pixels of the outline of the target to distinguish its unique profile. The target becomes unidentifiable at a distance if the reflectance of either the lit or shadowed portion of the target falls within the range of the local background. The identifiability metric determines the distance at which all portions of the target can be distinguished from the background for a given imaging system MTF and magnification. Inventive Example 3 exhibits a significant reduction in the identifiability of the target in UV and NIR spectral ranges while being virtually unidentifiable in the VIS (B, G, R). As explain above, the identifiability in UV and NIR where affected by the close proximity to the green grass covered field and would expect to be reduced at high altitudes.

Unlike Comparative Example 5, the solar glint from Inventive Example 3 was indistinguishable from glare. The combined glint and glare increase the reflected intensity by about 0.07 for UVA, 0.11 for RGB, and 0.15 for NIR. The low specular reflectance overcoat prevented glint and glare from contribution to the detection signal until the target is close enough or magnified enough for the glint and glare fill enough pixels to exceed the MTF of the imaging system.

TABLE 9B

Measured target detection and identification characteristics for Inventive Example 3.

| Spectral Range | UV | VIS-B | VIS-G | VIS-R | NIR |
|---|---|---|---|---|---|
| Sky Max-Min | 0.04 | 0.12 | 0.11 | 0.11 | 0.13 |
| Example 3 Detectability | 0.14 | 0.11 | 0.02 | 0.00 | 0.10 |
| Ref W Detectability | 0.22 | 0.26 | 0.31 | 0.34 | 0.41 |
| Ref K Detectability | 0.37 | 0.46 | 0.26 | 0.12 | 0.02 |
| Example 3 Identifiability | 0.06 | 0.00 | 0.00 | 0.01 | 0.16 |
| Ref W Identifiability | 0.15 | 0.20 | 0.16 | 0.05 | 0.44 |
| Ref K Identifiability | 0.37 | 0.43 | 0.24 | 0.11 | 0.04 |
| Example 3 Solar Glint Addition | 0.07 | 0.11 | 0.11 | 0.11 | 0.15 |
| Ref W Solar Glint Addition | 0.30 | >0.33 | >0.40 | >0.44 | >0.28 |
| Ref K Solar Glint Addition | 0.62 | 0.87 | 0.89 | 0.90 | NA |

Inventive Example 4: Aerial High UV Reflectance Blue-Sky Camouflage Coating

A first coating fluid to act as a broadly absorbing underlayer was prepared with carbon black, porous particles with pore sizes effective at scattering in the NIR, and a matrix polymer comprising Hystretch® V43 (a polyurethane emulsion from Lubrizol with a Tg of −43° C.) and Acrysol™ G-111 (an ammonia neutralized poly-acrylate solution polymer useful as viscosity modifier available from Dow Chemical Company). The resulting fluid had 50 volume % solids plus pores and 40 weight % solids with 1.7% carbon by weight.

A second coating fluid to emulate blue sky was made using the 5.4 micron particle P6 at 36 volume % solids plus pores and at volume ratio of 3 parts by volume particles to 2 parts matrix polymer, where the matrix polymer included Hystretch® V43, Cycmel 373 (a partially methylated melamine useful as a cross-linker from Palmer Holland Inc.), and Acrysol™ G-111. A solution of direct blue 71 was added to obtain a level of 1758 ppm in the final dry coating.

A third coating fluid to act as a low specular reflectance overcoat was prepared using the 5.4, 12, and 30 micron particles P6, P7, and P8 in a ratio of 2-to-2-to-1 at 36 volume % solids and at a volume ratio of 8 parts by volume particles to 5 parts matrix polymer, where the matrix polymer included Hystretch® V43 and Acrysol™ G-111.

An inflated spherical 16 in black Orbz balloon was spray coated with the first fluid comprising porous polymer particle, carbon black, and matrix polymer to achieve sufficient absorbance in the IR. When dry, the second coating fluid was sprayed over the top two thirds of the balloon and dried. The balloon was coated multiple times with thin spray coats of the third fluid to achieve uniform low specular reflectance, corresponding to a combination of FIG. 6A and FIG. 8D. Several extra coatings of the third coating fluid were applied on the bottom third of the balloon to increase the reflectance in the UVA/B and VIS wavelength ranges.

The balloon was imaged in UV, VIS, and NIR spectral ranges against a blue sky at low humidity about 50 to 75 feet above a grass field in mid-fall. The balloon was sectioned and the total diffuse reflectance spectrum was measured for lightly and heavily coated areas of both the top and bottom of the balloon. Table 10A summaries the total diffuse reflectance of the balloon sections. Table 10B summarizes various detectability and identifiability metrics evaluated from the imaged balloons. The extra coatings of the low specular reflectance topcoat applied to the bottom of the balloon was not enough to replace the reflectance UV and VIS-B lost due to not applying the blue-sky emulation second coating fluid to this part of the balloon. This increased the detectability over that which one would achieve when the blue-sky emulation second coating fluid is applied to the whole balloon. The increased UV reflectance of Inventive Example 4 decreased the identifiability in the UV wavelength range. The range in coating thickness on the top of the balloon produced differences in reflectance that were about equal to that of the solar glint and glare. The coating variations area modulations were somewhat less than the area of the solar glint and glare on the curved surface of the balloon providing additional camouflage protection.

TABLE 10A

Measured reflectance characteristics for Inventive Example 4.

| | % Total Diffuse Reflectance of Normal Incident Light | | | | | | |
|---|---|---|---|---|---|---|---|
| Sample | UVB 280-315 nm | UVA 320-380 nm | VIS-B 400-500 nm | VIS-G 500-600 nm | VIS-R 600-700 nm | NIR 720-1000 nm | SWIR 1000-1800 nm |
| Top Lt Coat | 45.0 | 49.6 | 35.2 | 18.4 | 13.6 | 10.9 | 7.3 |
| Top Hv Coat | 42.7 | 49.1 | 39.2 | 22.0 | 18.1 | 17.1 | 9.7 |
| Bot. Lt Coat | 34.0 | 29.2 | 18.4 | 12.9 | 10.5 | 9.8 | 14.7 |
| Bot. Hv Coat | 35.9 | 142.8 | 30.0 | 19.7 | 13.8 | 10.9 | 11.0 |

TABLE 10B

Measured target detection and identification characteristics for Inventive Example 4.

| Spectral Range | UV | VIS-B | VIS-G | VIS-R | NIR |
|---|---|---|---|---|---|
| Sky Max-Min | 0.07 | 0.29 | 0.25 | 0.19 | 0.24 |
| Example 4 Detectability | 0.10 | 0.05 | 0.00 | 0.03 | 0.15 |
| Ref W Detectability | 0.19 | 0.16 | 0.29 | 0.42 | 0.13 |
| Ref K Detectability | 0.48 | 0.58 | 0.29 | 0.09 | 0.15 |
| Example 4 Identifiability | 0.02 | 0.00 | 0.03 | 0.06 | 0.23 |
| Ref W Identifiability | 0.05 | 0.04 | 0.13 | 0.00 | 0.00 |
| Ref K Identifiability | 0.45 | 0.55 | 0.27 | 0.07 | 0.07 |

Inventive Example 5: Aerial Overcast-Sky Camouflage Coating

A coating fluid to emulate an overcast sky was made using particle P9 at 46 volume % solids plus pores and at volume ratio of 2 parts particles to 3 parts matrix polymer, where the matrix polymer included Hycar® 26120 and Carbopol® Aqua SF-1. Samples were prepared as described in Inventive Example 3 including the same low specular reflectance topcoat fluid. No subtractive colorant was used and the combined coatings corresponding to FIG. 8D. The Mie backward scattering effective pore size was 200 nm for the combined layers. The coated balloon was imaged on a solidly overcast but bright day at 50 to 75 feet above snow. The lighting was completely diffuse for these conditions and there was no observable specular reflection for Inventive Example 5 and the Reference balloons. Table 11A summaries the total diffuse reflectance of the samples. Table 11B summarizes various detectability and identifiability metrics.

TABLE 11A

Measured reflectance characteristics for Inventive Example 5

| Sample | Total Diffuse Reflectance of Normal Incident Light % | | | | | | |
|---|---|---|---|---|---|---|---|
| | UVB 280-315 nm | UVA 320-380 nm | VIS-B 400-500 nm | VIS-G 500-600 nm | VIS-R 600-700 nm | NIR 720-1000 nm | SWIR 1000-1800 nm |
| 3M Vinyl | 5.5 | 5.1 | 5.0 | 5.1 | 5.0 | 4.8 | 4.6 |
| Blade Coating | 45.2 | 58.1 | 54.1 | 47.3 | 41.3 | 32.3 | 17.9 |
| Slot Coating | 42.4 | 59.4 | 60.2 | 54.0 | 48.0 | 38.7 | 22.6 |

TABLE 11B

Measured target detection and identification characteristics for Inventive Example 5.

| Spectral Range | UV | VIS-B | VIS-G | VIS-R | NIR |
|---|---|---|---|---|---|
| White Sky Max-Min | 0.02 | 0.07 | 0.08 | 0.09 | 0.05 |
| Example 5 Detectability | 0.02 | 0.00 | 0.00 | 0.00 | 0.07 |
| Ref W Detectability | 0.19 | 0.05 | 0.05 | 0.04 | 0.07 |
| Ref K Detectability | 0.49 | 0.46 | 0.40 | 0.36 | 0.21 |
| Example 5 Identifiability | 0.02 | 0.00 | 0.00 | 0.00 | 0.07 |
| Ref W Identifiability | 0.17 | 0.04 | 0.04 | 0.03 | 0.06 |
| Ref K Identifiability | 0.47 | 0.45 | 0.39 | 0.35 | 0.12 |

While the overcoat was penetrated by water in about 1 hour the white emulation layer showed no loss of light scattering for 8 hours. This white sky emulation multispectral camouflage coating would maintain its color performance after being exposed to rain with slow drying conditions under heavy clouds.

Inventive Example 6: Impermeable Blue-Sky Camouflage Coating

A first barrier layer comprising 15% AQ™ 38S (a sulfopolyester having a $T_g$ of 38° C. from Eastman Chemical Company) dissolved in water was coated on CDT 3M™ Wrap Film Series 1080 matte black vinyl using a #7 wire wound rod from RD Specialties Inc. to form a 2.6 micron polymer barrier layer. This barrier layer was effective in preventing the UV stabilizer octocrylene in the vinyl from migrating into the porous particle coatings at temperatures below about 33° C. A second barrier layer comprising 5% 996,000 Mw PMMA dissolved in ethyl acetate was coated over the first barrier layer using a #20 wire wound rod from RD Specialties Inc. to form a 2.5 micron polymer barrier layer that was effective in slowing the octocrylene migration into the porous particle coatings at temperatures below about 100° C. thus enabling intermittent working temperatures above 33° C. A coating fluid to form a blue-sky emulation layer comprising porous particles, matrix polymer and a subtractive colorant was made using the 5.4 micron particle P6. The coating fluid contained 43 volume % solids plus pores at volume ratio of 2 parts particles to 3 parts matrix polymer, where the matrix polymer comprised 99% Hycar® 26120 and 1% Carbopol® Aqua SF-1 from Lubrizol. The subtractive colorant solution of DB 71 was added to obtain a level of 353 ppm DB 71 in the final dry coating. This fluid was coated on the CTD PMMA barrier layer using #50G wire wound rod from RD Specialties Inc. that produced a 5 mil wet coating to form a 54 micron blue-sky emulation layer when dried corresponding to FIG. 6A.

Eight topcoat coating fluids were prepared including Porous Particles P6, P7, and P8 at 43 volume % solids plus pores and at volume ratio of 3 parts particles to 2 parts matrix polymer, where the matrix polymer comprised Hycar® 26349 (a solvent resistant thermoset acrylic emulsion from Lubrizol with a $T_g$ of 12° C.) and Carboset® CR675 at 0, 50%, 75%, and 100% Carboset®. Dowanol™ PMA from Dow Chemicals, Inc. was as a coalescing aid, and either 0% and 0.14% dimethyl ethanol amine (DMEA) as a pH modifier. These fluids were coated using a blade having a 2 mil gap to produce coatings, corresponding to FIG. 8D, that were about twice the optimum thickness for low specular reflectance coatings to enable toughness studies using the micro-scratch test described above. The coatings were dried at 45° C. for 5 minutes then cured at 98° C. for 5 minutes.

The coatings were evaluated using the micro-scratch test and wetting test described in the Evaluations Methods section above. Additionally, the ability to be stretched at 20° C. without cracking was subjectively evaluated under a microscope. The thermoset acrylic emulsions are alkaline, and the cross-linking reaction requires high pH. The DMEA raises the pH to counter the acidic silica from the porous particles thus increasing the cross-linking the Hycar® and as well as increasing the adhesion of the Carboset® polymer resulting in greater toughness and scratch resistance. The pH modifier had no effect on wetting and penetrations of the coatings by water. Compositions containing at least 50% Carboset® CR675 gave wetting times greater than time it would take to dry off a target encountering a brief rainstorm in blue sky conditions. The styrenic composition and high $T_g$ of the Carboset® CR675 (70° C.) compared to the Hycar® 26349 (12° C.) provided greater resistance to penetration of the porous particles by water. Observed cracking of the coatings occurred at lower levels of elongation for increasing Carboset® CR675 in the matrix polymer. This cracking performance is related to the $T_g$ of the polymers and would occur at greater elongations for the recommended temperature of 40° C. for application of the film to substrates.

TABLE 11

Scratch and wetting characteristics for Inventive Example 6

| Carboset® CR675 | Micro-Scratch Failure Load (g) | | Wetting Time (hours) | |
|---|---|---|---|---|
| | no DMEA | 0.14% DMEA | Onset | Complete |
| 0% | 125 | 274 | 0.25 | 0.75 |
| 50% | 105 | 130 | 1 | 1.5 |
| 75% | 109 | 138 | 1.5 | 2.5 |
| 100% | 155 | 190 | 2.5 | 3.5 |

The present invention provides at least the preceding embodiments and combinations thereof, but other variations and modifications are considered to be within the present invention as a skilled artisan would appreciate from the teaching of this disclosure:

PARTS LIST

100 article
105 substrate
110 surface
120 coating
125 porous particle 125a porous particle
125b porous particle
125c porous particle
125d porous particle
125e porous particle
125f porous particle
130 binder
132 colorant
135 impermeable shell
140 pores
142 first set of pores
144 second set of pores
146 third set of pores
150 underlying layer
155 overcoat layer
160 cap
162 cap
164 cap
200 multimodal particle size distribution
205 distribution function
210 mode
212 mode
214 mode
216 mode
240 graph
250 spectrum
260 spectrum
270 spectrum
300 form suspension of monomer droplets step
310 polymerize monomers step
320 remove porogen step
330 remove inorganic colloid step

The invention claimed is:

1. A method for preparing core/shell particles comprising:
   a) forming a suspension of ethylenically unsaturated monomer droplets containing one or more monomers and a porogen in an aqueous medium containing a first stabilizer, a polymerization initiator, and a promoter species, wherein at least one of the one or more monomers is a cross-linking monomer, and wherein the first stabilizer is an inorganic colloid;
   b) polymerizing the one or more monomers to form core/shell particles comprising a porous core of a porous polymer and an impermeable polymeric shell having a shell thickness of at least 5 nm, and having the first stabilizer disposed thereon;
   c) removing the porogen; and
   d) removing the first stabilizer that is disposed on the impermeable polymeric shell of the core/shell particles; and optionally
   e) forming a film-forming latex coating over the core/shell particles after removing the first stabilizer,
   wherein the porogen includes two or more solvents, and one of the solvents has a greater miscibility in water than the one or more other solvents.

2. The method of claim 1, wherein a majority of the one or more monomers in the ethylenically unsaturated monomer droplets have a log Po/w below 2.0.

3. The method of claim 1, wherein the aqueous medium further contains a second stabilizer to provide a colloidally stabilized suspension, wherein the second stabilizer is a poly(2-ethyl-2-oxazoline) homopolymer.

4. The method of claim 1, wherein the step of polymerizing the one or more monomers is initiated by heating the suspension.

5. The method of claim 1, wherein one of the solvents is ethyl acetate and a second of the solvents is cyclohexane.

* * * * *